United States Patent
Kim et al.

(10) Patent No.: US 9,813,881 B2
(45) Date of Patent: Nov. 7, 2017

(54) MESSAGING AUTOMATIC RESPONSE SERVICE SERVER AND METHOD FOR TRANSCEIVING AUTOMATIC RESPONSE SERVICE MESSAGE WITH MOBILE DEVICE

(71) Applicant: KT Corporation, Seongnam-si (KR)

(72) Inventors: Hak-jun Kim, Seoul (KR); Min-chul Kim, Seoul (KR); Kyu-ho Lee, Yongin-si (KR); Sang-hoon Yeo, Seoul (KR)

(73) Assignee: KT CORPORATION, Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/772,813

(22) PCT Filed: Nov. 27, 2013

(86) PCT No.: PCT/KR2013/010870
§ 371 (c)(1),
(2) Date: Sep. 4, 2015

(87) PCT Pub. No.: WO2014/137056
PCT Pub. Date: Sep. 12, 2014

(65) Prior Publication Data
US 2016/0014580 A1    Jan. 14, 2016

(30) Foreign Application Priority Data

Mar. 7, 2013  (KR) .......................... 10-2013-0024494

(51) Int. Cl.
*H04M 11/10*      (2006.01)
*H04W 4/16*      (2009.01)
(Continued)

(52) U.S. Cl.
CPC ............... *H04W 4/16* (2013.01); *H04L 51/02* (2013.01); *H04M 3/493* (2013.01); *H04W 4/12* (2013.01);
(Continued)

(58) Field of Classification Search
CPC ....... H04W 4/12; H04W 4/14; H04W 88/184; H04M 1/72552; H04M 1/64; H04M 3/42382; H04M 2203/651; H04M 3/53333
(Continued)

(56) References Cited

U.S. PATENT DOCUMENTS

| | | | |
|---|---|---|---|
| 8,195,509 B1 * | 6/2012 | Mhatre | ................... G06Q 30/02 705/14.1 |
| 2003/0228007 A1 * | 12/2003 | Kurosaki | ................ H04M 3/51 379/142.06 |

(Continued)

FOREIGN PATENT DOCUMENTS

| | | |
|---|---|---|
| KR | 10-2003-0048662 A | 6/2003 |
| KR | 10-2006-0002410 A | 1/2006 |

(Continued)

OTHER PUBLICATIONS

International Search Report from International Application No. PCT/KR2013/010870 dated Jan. 29, 2014.

*Primary Examiner* — Charles Appiah
*Assistant Examiner* — Jaime Holliday
(74) *Attorney, Agent, or Firm* — Brundidge & Stanger, P.C.

(57) ABSTRACT

There is provided a messaging automatic response service (ARS) server for transceiving an ARS text message with a mobile device. The messaging ARS server includes: a receiver configured to receive an ARS request text message sent by the mobile device from a message service center (Continued)

server; an ARS text message generator configured to analyze the received ARS request text message and generate an ARS response text message including at least one automatic response menu text; a transmitter configured to transmit the generated ARS response text message to the message service center server; a state information generator configured to generate state information corresponding to one or more of the received ARS request text message and the generated ARS response text message; and a state information transmitter configured to transmit the generated state information to a first apparatus of a voice ARS system.

17 Claims, 21 Drawing Sheets

(51) Int. Cl.
| | |
|---|---|
| H04W 4/12 | (2009.01) |
| H04M 3/493 | (2006.01) |
| H04L 12/58 | (2006.01) |
| H04M 1/64 | (2006.01) |
| H04M 1/725 | (2006.01) |
| H04W 88/18 | (2009.01) |
| H04W 4/14 | (2009.01) |
| H04M 3/533 | (2006.01) |
| H04M 3/42 | (2006.01) |

(52) U.S. Cl.
CPC .......... H04M 1/64 (2013.01); H04M 1/72552 (2013.01); H04M 3/42382 (2013.01); H04M 3/53333 (2013.01); H04M 2203/651 (2013.01); H04W 4/14 (2013.01); H04W 88/184 (2013.01)

(58) Field of Classification Search
USPC .............................................. 455/414.1, 466
See application file for complete search history.

(56) References Cited

U.S. PATENT DOCUMENTS

| | | | |
|---|---|---|---|
| 2008/0147407 A1* | 6/2008 | Da Palma | ............... G10L 15/22 704/260 |
| 2010/0082652 A1* | 4/2010 | Jones | ..................... G06Q 30/02 707/758 |
| 2012/0237009 A1* | 9/2012 | Szpilfogel | ............. H04M 3/493 379/88.13 |
| 2013/0138443 A1* | 5/2013 | Kim | .................... H04M 1/2535 704/270.1 |

FOREIGN PATENT DOCUMENTS

| | | |
|---|---|---|
| KR | 10-2008-0028102 A | 3/2008 |
| KR | 10-2009-0037560 A | 4/2009 |
| KR | 10-2009-0098055 A | 9/2009 |
| KR | 10-2013-0015195 A | 2/2013 |

* cited by examiner

MESSAGING AUTOMATIC RESPONSE SERVICE SERVER AND METHOD FOR TRANSCEIVING AUTOMATIC RESPONSE SERVICE MESSAGE WITH MOBILE DEVICE

TECHNICAL FIELD

The embodiments described herein pertain generally to a messaging automatic response service server and method for transceiving an automatic response service text message with a mobile device.

BACKGROUND ART

An automatic response service (ARS) system refers to an automatic response system, which saves various types of information as voice content in a memory and then informs a user of a method to search his/her desired information through a help of guidance voice when he/she accesses the ARS system by a telephone, and provides the user with necessary information through voice when the user finds the information.

The ARS system is being mostly used in customer service centers of companies, and a customer service center may require customer information of a user in order to provide information that the user needs faster. With regard to the ARS system, Korean Patent Application Publication No. 2008-0028102 as a conventional technology describes a method for providing an automatic response service, and a terminal and a system therefor.

However, the conventional ARS system has been inconvenient in that since the conventional ARS system provides users with information only through voice and is not visual, a user should concentrate on the voice when using the ARS system, and needs to repeat the voice of the ARS system in the event that he/she fails to understand the ARS voice. Further, since information provided through voice is not saved in a mobile device, a user could not have search the same information once again after the use of ARS. Due to this inconvenience, users have tended to prefer direct connection to a counselor, rather than guidance through automatic voice, even for simple information search, and this phenomenon has resulted in a financial burden to companies operating counseling centers.

DISCLOSURE OF THE INVENTION

Problems to be Solved by the Invention

The example embodiments provide a messaging ARS server and method for reducing service time and service cost through an automatic response service based on a text message.

In addition, the example embodiments provide a messaging ARS server and method that visualize voice into a text to eliminate users' inconvenience such as repeatedly listening a voice message and pressing a keypad during a call, and provide a user with a visual text message, so as to further improve user convenience for information search.

In addition, the example embodiments provide a messaging ARS server and method for directly connecting a user of a mobile device and an ARS counsellor to each other, when input of a call button for requesting connection to the counsellor is received from the user who is using messaging ARS through text messages.

In addition, the example embodiments provide a messaging ARS server and method for reducing counsellor management costs burdened to an ARS operator, by reducing counselor connections for simple inquiries. However, the problems sought to be solved by the present disclosure are not limited to the above description, and other problems can be clearly understood by those skilled in the art from the following description.

Means for Solving the Problems

In accordance with an example embodiment, there may be provided a messaging automatic response service (ARS) server for transceiving an ARS text message with a mobile device. The messaging ARS server includes: a receiver configured to receive an ARS request text message sent by the mobile device from a message service center server; an ARS text message generator configured to analyze the received ARS request text message and generate an ARS response text message including at least one automatic response menu text; a transmitter configured to transmit the generated ARS response text message to the message service center server; a state information generator configured to generate state information corresponding to one or more of the received ARS request text message and the generated ARS response text message; and a state information transmitter configured to transmit the generated state information to a first apparatus of a voice ARS system.

In accordance with another example embodiment, there may be provided a method for transceiving an automatic response service (ARS) text message with a mobile device. The method includes: receiving an ARS request text message sent by a mobile device from a message service center server; analyzing the received ARS request text message and generating an ARS response text message including at least one automatic response menu text; transmitting the generated ARS response text message to the message service center server; generating state information corresponding to one or more of the received ARS request text message and the generated ARS response text message; and transmitting the generated state information to a first apparatus of a voice ARS system.

In accordance with still another example embodiment, there may be provided a mobile device. The mobile device includes: an input receiver configured to receive input of an identification number of a messaging ARS server through user interface; an ARS request text message generator configured to generate an ARS request text message based on the input identification number; a receiver configured to transmit the generated ARS request text message to a message service center server, and receive an ARS response text message including at least one automatic menu text from the message service center server; a display configured to display the received automatic response menu text on a display of the mobile device; and a voice ARS processor configured to connect to a voice ARS system, when a button corresponding to voice ARS is selected through the user interface, wherein the voice ARS processor receives, from the voice ARS system, ARS voice data corresponding to one or more of the ARS request text message and the ARS response text message.

Effect of the Invention

In accordance with the example embodiments, it is possible to provide a messaging ARS server and method for reducing service use time and service fees through an automatic response service based on text messages.

In addition, it is possible to provide a messaging ARS server and method that visualize voice in a text manner to eliminate users' inconvenience such as repeating a voice message and using a keypad during a call, and provide a user with a visual text message, so as to further improve user convenience for information search.

In addition, it is possible to provide a messaging ARS server and method for directly connecting a user of a mobile device and an ARS counsellor to each other, when input of a call button for requesting connection to the counsellor is received from the user who is using messaging ARS through text messages.

In addition, it is possible to provide a messaging ARS server and method for reducing counsellor management costs burdened to an ARS operating subject, by reducing counsellor connections for simple inquiries.

EXPLANATION OF CODES

Figure 1:
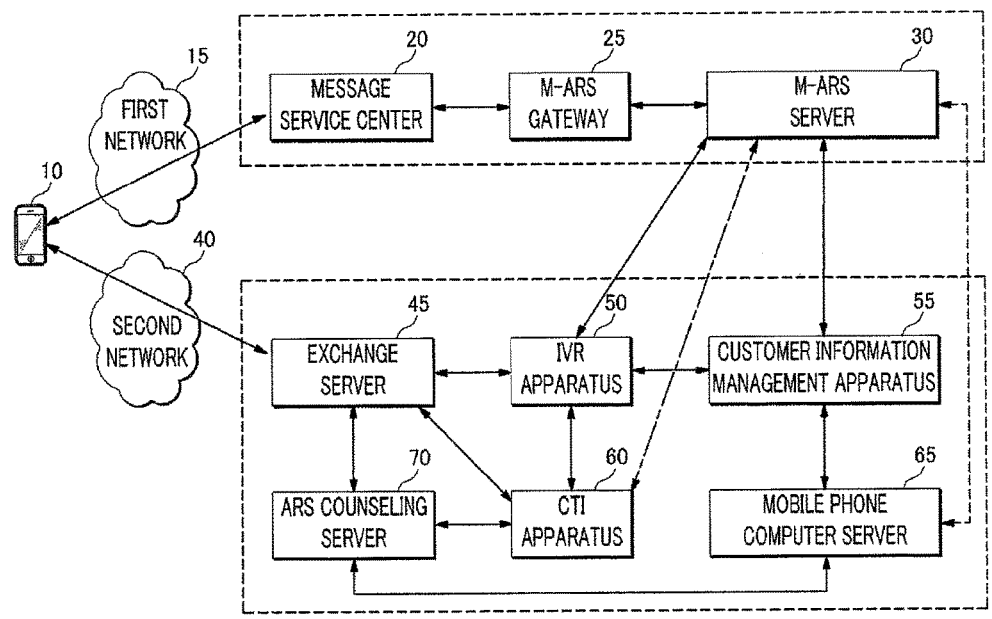
FIG. 1 is a configuration diagram of an ARS text message providing system in accordance with an example embodiment.

10: Mobile device
20: Message service center server
25: Messaging automatic response service (ARS) gateway
30: Messaging ARS server
45: Exchange server
50: Interactive voice response (IVR) apparatus
55: Customer information management apparatus
60: Computer telephony integration (CTI)
65: Mobile phone computer server
70: ARS counseling server

DETAILED DESCRIPTION

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

Hereinafter, the example embodiments are described in detail with reference to the accompanying drawings.

FIG. 1 is a configuration diagram of an ARS text message providing system in accordance with an example embodiment. Referring to FIG. 1, the ARS text message providing system includes a mobile device 10, a message service center server 20, a messaging ARS gateway 25, and a messaging ARS server 30 of a messaging ARS system 1, and an exchange server 45, an IVR apparatus 50, a customer information management apparatus 55, a CTI apparatus 60, a mobile phone computer server 65, and a voice ARS counseling server 70 of a voice ARS counseling system 2. In this case, the mobile device 10, the message service center server 20, the messaging ARS gateway 25, the messaging ARS server 30, the exchange server 45, the IVR apparatus 50, the customer information management apparatus 55, the CTI apparatus 60, the mobile phone computer server 65 and the voice ARS counseling server 70 are not limited to those illustrated in FIG. 1. That is, in accordance with various example embodiments of the present disclosure, the ARS text message providing system may be configured differently from that in FIG. 1.

The components of the ARS text message providing system in FIG. 1 are generally connected through a network. For example, as illustrated in FIG. 1, the mobile device 10 is connected to the message service center server 20, the messaging ARS gateway 25, and the messaging ARS server 30 through a first network 15. In addition, the mobile device 10 is connected to the IVR apparatus 50, the customer information management apparatus 55, the CTI apparatus 60, the mobile phone computer server 65, and the voice ARS counseling server 70 through a second network 40.

The first network 15 and the second network 40 mean connection structures that enable information exchange between nodes such as terminals and servers, and include, for example, Internet, a local area network (LAN), a wireless local area network (wireless LAN), a wide area network (WAN), a personal area network (PAN), 3G, 4G, LTE and so on, but are not limited thereto.

Referring to FIG. 1, the first network, which connects the mobile device 10 and the messaging ARS server 30 to each other, and the second network, which connects the mobile device 10 and the voice ARS counseling system 2 to each other, may be different from each other in terms of network types. For example, the first network may be a mobile communication network, and the second network may be a wired/wireless telephone network, but the present disclosure may not be limited thereto.

Referring to FIG. 1, the mobile device 10 generates an ARS request text message and transmits the message to the message service center server 20. The ARS request text message includes an identification number of the messaging ARS server 30, and may be transmitted in the form of a short message service (SMS) or a multimedia message service (MMS). The identification number of the messaging ARS server 30 refers to an ARS main number created newly by a service provider or a conventionally used ARS main number, and an example for the identification number of the messaging ARS server 30 may be '1588-XXXX.'

Examples for the mobile device 10 may include, but not limited to, any type of a handheld-based wireless communication device such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart phone, a smart pad, and a tablet PC.

The message service center server 20 may be, for example, a short message service center (SMSC). The message service center server 20 is equipment present in a wireless network of a communication company, and implements transmitting and receiving SMS with a terminal through a wireless network.

The message service center server 20 transmits the received ARS request text message to the messaging ARS gateway 25. In this case, the ARS request text message may be transmitted to the messaging ARS gateway 25 through a messaging platform (MP) server (not illustrated) and a smart SMS server (not illustrated). The MP server (not illustrated) is equipment for text message interworking with other mobile communication companies, and implements receiving and transmitting short or long texts through SMS or MMS interworking with other mobile communication companies. The smart SMS server (not illustrated) is equipment that enables transmission/reception of text messages in a terminal corresponding to a land-line area code number or a specific number like '1588-XXXX'; as well as a mobile communication terminal. The messaging ARS gateway 25 refers to a server that receives texts transmitted to a specific number through a network to transmit the texts to the messaging ARS server 30, and transmits texts from the messaging ARS server 30 to the mobile device 10 through a communication network.

The messaging ARS gateway 25 transmits the ARS request text message received from the message service center server 20 to the messaging ARS server 30.

The messaging ARS server 30 relays data between different nodes of the messaging ARS system 1 and the voice ARS counseling system 2. The messaging ARS server 30 is present within a system of a company providing customers with an ARS service, and analyzes the ARS request text message received from the messaging ARS gateway 25 to generate an ARS response text message including at least one automatic response menu text.

The messaging ARS server 30 generates state information for a history of an automatic response to the mobile device 10 based on one or more of the received ARS request text message and the generated ARS response text message. The messaging ARS server 30 includes the state information, and when search of the state information is requested from a first apparatus, the messaging ARS server 30 may transmit the searched state information to the first apparatus. In addition, the messaging ARS server 30 may synchronize and transmit the state information to the first apparatus. Various examples for the messaging ARS server 30 include a communication relay server, a content providing server, a content service provider server, a media server, a head end and so on.

The messaging ARS server 30 transmits the generated ARS response text message to the messaging ARS gateway 25. The messaging ARS gateway 25 finally transmits the received ARS response text message to the mobile device 10. The ARS response text message may be transmitted to the mobile device 10 through, for example, an open API service platform providing a function to authenticate a customer and a terminal or transmit texts.

The ARS text message providing system may mean a total system that provides the user of the mobile device 10 with voice ARS counseling through interworking with the messaging ARS system 1 and the conventional voice ARS counseling system 2. The voice ARS counseling system 2 may receive an ARS counseling signal from the messaging ARS system 1.

Referring to FIG. 1, the voice ARS counseling system 2 includes an exchange server 45, an IVR apparatus 50, a customer information management apparatus 55, a CTI apparatus 60, a mobile phone computer server 65, and a voice ARS counseling server 70.

When an identification number of the voice ARS counseling system 2 is input from the user of the mobile device 10, an ARS counseling request signal is transmitted to the exchange server 45 through terminal equipment included in the second network (e.g., a wired/wireless call network). The terminal equipment refers to equipment placed at a beginning part and an end part of a transmission facility to match with exchange equipment or the like, and implements notifying the exchange server 45 of introduction of an ARS counseling call. Examples for the terminal equipment include PCM terminal equipment, FDM terminal equipment, optical terminal equipment, satellite terminal equipment, image terminal equipment and so on.

The exchange server 45 transmits the received ARS counseling request signal to the IVR apparatus 50. The exchange server 45 serves as a kind of a switch for converting a call from an outside area code number into an extension number. An example for the exchange server 45 may be a private branch exchange (PBX). The interactive voice response (IVR) apparatus 50 transmits a voice menu, as a voice automatic response, to the mobile device 10 when the ARS counseling request signal is introduced from the exchange server 45.

In addition, the exchange server 45 acquires automatic number identification (ANI) information from the received ARS counseling request signal and transmits the information to the computer telephony integration (CTI) apparatus 60, and the CTI apparatus 60 transmits the received ANI information to the IVR apparatus 50. When the ARS counseling request signal transmitted by the user of the mobile device 10 is introduced into the voice ARS counseling system 2, the ANI information is used for a technology that automatically identifies a phone number of the transmitter.

When a number corresponding to the voice menu is input from the user through a keypad of the mobile device 10, the IVR apparatus 50 may send a voice submenu corresponding to the input number through a dual tone multifrequency (DTMF) technology. The DTMF technology refers to a technology, by which when a number is input from a telephone, a composite frequency signal is applied to an exchanger, and the exchanger analyzes the signal to convert the signal into digit information.

The IVR apparatus 50 may implement a user authentication function by using the DTMF technology when customer information is necessary. When specific numbers associated with a user, e.g., latter seven digits of a resident registration number, are input from the user of the mobile device 10, the IVR apparatus 50 requests a customer information search from the customer information management apparatus 55, and the customer information management apparatus 55 may transmit the searched customer information to the IVR apparatus 50. In this case, the IVR apparatus 50 may request a counseling group from the CTI apparatus 60 based on the searched customer information and the ANI information.

The CTI apparatus 60 searches an available counsellor within the counselling group, and instructs the exchange server 45 to connect the searched counsellor to the mobile device 10. The exchange server 45 makes recording instructions to a recording device, and connects the voice ARS counseling server 70 and the mobile device 10 to each other for counseling. In this case, the CTI apparatus 60 transmits the customer information received from the IVR apparatus 50 to the voice ARS counseling server 70.

The mobile phone computer server 65 manages the voice ARS counseling system 2. The mobile phone computer server 65 refers to, for example, a wireless business computer system like a new service technology evolution platform (N-STEP), and implements supporting and managing general wireless businesses such as new subscription, number porting, device changing, transfer, and charging. When the user of the mobile device 10 uses the ARS text message providing system later, the mobile phone computer server 65 may provide the voice ARS counseling server 70 with an ARS counseling history for the user of the mobile device 10.

Referring to FIG. 1, there may be various example embodiments depending on an operating subject including state information of the ARS text message providing system.

A first example embodiment corresponds to the case where the messaging ARS server 30 includes state information, and state information search is requested from the first apparatus.

In accordance with the first example embodiment, the mobile device 10 generates the ARS request text message including the identification number of the messaging ARS server 30 and transmits the message to the message service center server 20.

The message service center server 20 transmits the received ARS request text message to the messaging ARS server 30 via the messaging ARS gateway 25.

The messaging ARS server 30 may receive the ARS request text message sent by the mobile device 10 from the message service center server 20, and generate an ARS response text message corresponding to the ARS request text message to provide the message to the mobile device 10. In this case, the ARS response text message includes the identification number of the mobile device 10, and may be generated based on the customer information of the user of the mobile device 10. The messaging ARS server 30 may search the customer information of the mobile device 10 from a second apparatus, and in this case, the second apparatus may be the customer information management apparatus 55.

The messaging ARS server 30 includes state information for an automatic response history from the messaging ARS server 30 to the mobile device based on one or more of the received ARS request text message and the generated ARS response text message. When a user who is using messaging ARS inputs a messaging ARS identification number through user interface, the mobile device 10 may request voice ARS counseling from the first apparatus. In this case, the first apparatus that has received the request for voice ARS counseling may request search of the state information from the messaging ARS server 30, and the messaging ARS server 30 may transmit the searched state information to the first apparatus.

In accordance with the first example embodiment, the first apparatus may be the IVR apparatus 50, and the IVR apparatus 50 receives the generated state information from the messaging ARS server 30. Also, the first apparatus may receive the searched customer information from the messaging ARS server 30. The first apparatus may initiate a voice ARS service process with the mobile device 10 based on the state information and the customer information. The first apparatus may transmit the received customer information and state information to a third apparatus of the ARS counseling system 2, and in this case, the third apparatus may be the CTI apparatus 60 included in the voice ARS counseling system 2.

The third apparatus searches an available counselor within the counselling group to provide the exchange server 45 with instructions for connection to a counselor, and transmits the searched customer information to the voice ARS counseling server 70. Finally, the exchange server 45 connects the voice ARS counseling server 70 and the mobile device 10 to each other for counseling.

A second example embodiment corresponds to the case where the messaging ARS server 30 receives an ARS request text message including location information from the mobile device 10.

In accordance with the second example embodiment, the mobile device 10 generates an ARS request text message including location information and transmits the message to the message service center server 20. The ARS request text message including location information may be a text message transmitted through, for example, a short message peer-to-peer (SMPP) protocol. The SMPP protocol is a protocol used for transmission of short messages between switched network equipment (e.g., exchangers, base stations and SMSC), and includes the standard of No7(SS7), which was developed by Aldiscon and is a switched network international standard protocol.

The message service center 20 extracts the location information from the received ARS request text message received through the SMPP protocol, and transmits the extracted location information together with the ARS request message to the messaging ARS gateway 25 through a short message client interface (SMCi) protocol. The SMCi protocol is a protocol for transmitting a text message, which will be delivered through a wireless switched network protocol, between equipment in an Internet protocol (IP) network and was developed by NewNet.

The message service center server 20 transmits the received ARS request text message to the messaging ARS server 30 via the messaging ARS gateway 25.

The messaging ARS server 30 receives the ARS request text message sent by the mobile device 10 from the message service center server 20, and generates an ARS response text message corresponding to the ARS request text message to provide the message to the mobile device 10. In this case, the ARS response text message includes the identification number of the mobile device 10, and may be generated based on the customer information of the user of the mobile device 10. The messaging ARS server 30 may search the customer information of the mobile device 10 from the second apparatus, and in this case, the second apparatus may be the customer information management apparatus 55.

The messaging ARS server 30 includes state information for an automatic response history from the messaging ARS server 30 to the mobile device based on one or more of the received ARS request text message and the generated ARS response text message. When the messaging ARS server 30 receives an ARS counseling request from the mobile device 10, the messaging ARS server 30 synchronizes and transmits the state information to the first apparatus. In this case, the messaging ARS server 30 may transmit the customer information searched from the second apparatus to the first apparatus.

When the user of the mobile device 10 requests text ARS counseling, the messaging ARS server 30 may identify location information of the SMCi protocol, and synchronize and transmit the state information to a first apparatus of a customer service center in an area where the user of the mobile device 10 is located, and the first apparatus may directly request connection to the counseling group according to the synchronized state information in response to the introduced voice ARS counseling request.

In accordance with the second example embodiment, the first apparatus may be the IVR apparatus 50, and the IVR apparatus 50 receives the state information and the customer information from the messaging ARS server 30. The first apparatus may initiate the voice ARS service process with the mobile device 10 based on the received state information and customer information.

The first apparatus requests connection to a counselor from the CTI apparatus 60, and the CTI apparatus 60 searches an available counselor within the counseling group, provides the exchange server 45 with instructions for connection to a counselor, and transmits the searched customer information to the voice ARS counseling server 70. Finally, the exchange server 45 connects the voice ARS counseling server 70 and the mobile device 10 to each other for counseling.

However, in the second example embodiment, it may be difficult to extract location information, in case of an ARS request text message sent by an outside subscriber.

A third example embodiment corresponds to the case where the messaging ARS server 30 synchronizes and transmits the generated state information to the first apparatus.

In accordance with the third example embodiment, the mobile device 10 generates an ARS request text message and transmits the message to the message service center server 20. In this case, the ARS request text message includes the identification number of the messaging ARS server 30.

The message service center server 20 transmits the received ARS request text message to the messaging ARS server 30 via the messaging ARS gateway 25.

The messaging ARS server 30 receives the ARS request text message sent by the mobile device 10 from the message service center sever 20, and generates an ARS response text message corresponding to the ARS request text message to provide the message to the mobile device 10. In this case, the ARS response text message includes the identification number of the mobile device 10, and may be generated based on the customer information of the user of the mobile device 10. The messaging ARS server 30 may search the customer information of the mobile device 10 from the second apparatus, and in this case, the second apparatus may be the customer information management apparatus 55.

The messaging ARS server 30 includes state information for an automatic response history from the messaging ARS server 30 to the mobile device based on one or more of the received ARS request text message and the generated ARS response text message. When the messaging ARS server 30 receives an ARS counseling request from the mobile device 10, the messaging ARS server 30 synchronizes and transmits the state information to the first apparatus. In this case, the messaging ARS server 30 may transmit the customer information searched from the second apparatus to the first apparatus.

In accordance with the third example embodiment, the first apparatus may be the mobile phone computer server 65, and the mobile phone computer server 65 receives the state information and the customer information from the messaging ARS server 30. The first apparatus may initiate the voice ARS service process with the mobile device 10 based on the received state information and customer information.

The first apparatus searches an available counselor within the counseling group to provide the exchange server 45 with instructions for connection to a counselor, and transmits the searched customer information to the voice ARS counseling server 70. Finally, the exchange server 45 connects the voice ARS counseling server 70 and the mobile device 10 to each other for counseling.

However, since the third example embodiment allows the mobile phone computer server 65 to manage the whole system, data correction may be difficult.

A fourth example embodiment corresponds to the case where the messaging ARS server 30 synchronizes and transmits the generated state information to the first apparatus.

In accordance with the fourth example embodiment, the mobile device 10 generates an ARS request text message and sends the message to the message service center server 20. In this case, the ARS request text message includes the identification number of the messaging ARS server 30.

The message service center server 20 transmits the received ARS request text message to the messaging ARS server 30 via the messaging ARS gateway 25.

The messaging ARS server 30 receives the ARS request text message sent by the mobile device 10 from the message service center server 20, and generates an ARS response text message corresponding to the ARS request text message to provide the message to the mobile device 10. In this case, the ARS response text message includes the identification number of the mobile device 10, and may be generated based on the customer information of the user of the mobile device 10. The messaging ARS server 30 may search the customer information of the mobile device 10 from the second apparatus, and in this case, the second apparatus may be the customer information management apparatus 55.

The messaging ARS server 30 includes state information for an automatic response history from the messaging ARS server 30 to the mobile device based on one or more of the received ARS request text message and the generated ARS response text message. When the messaging ARS server 30 receives an ARS counseling request from the mobile device 10, the messaging ARS server 30 synchronizes and transmits the state information to the first apparatus. In this case, the messaging ARS server 30 may transmit the customer information searched from the second apparatus to the first apparatus.

In accordance with the fourth example embodiment, the first apparatus may be the IVR apparatus 50, and the IVR apparatus 50 receives the generated state information from the messaging ARS server 30. The first apparatus may initiate the voice ARS service process with the mobile device 10 based on the received state information. The first apparatus may search the customer information of the mobile device 10 from the second apparatus, and in this case, the second apparatus may be the customer information management apparatus 55.

The IVR apparatus 50 as the first apparatus may internally search the state information, and transmit the searched state information and customer information to the CTI apparatus 60.

The CTI apparatus 60 searches an available counselor within the counseling group and provides the exchange server 45 with instructions for connection to a counselor, and transmits the searched customer information to the voice ARS counseling server 70. Finally, the exchange server 45 connects the voice ARS counseling server 70 and the mobile device 10 to each other for counseling.

However, since the fourth example embodiment should transmit the state information to all nationwide IVR apparatuses 50 each time the mobile device 10 accesses to the messaging ARS server 30, overload in a server may occur.

Figure 2:
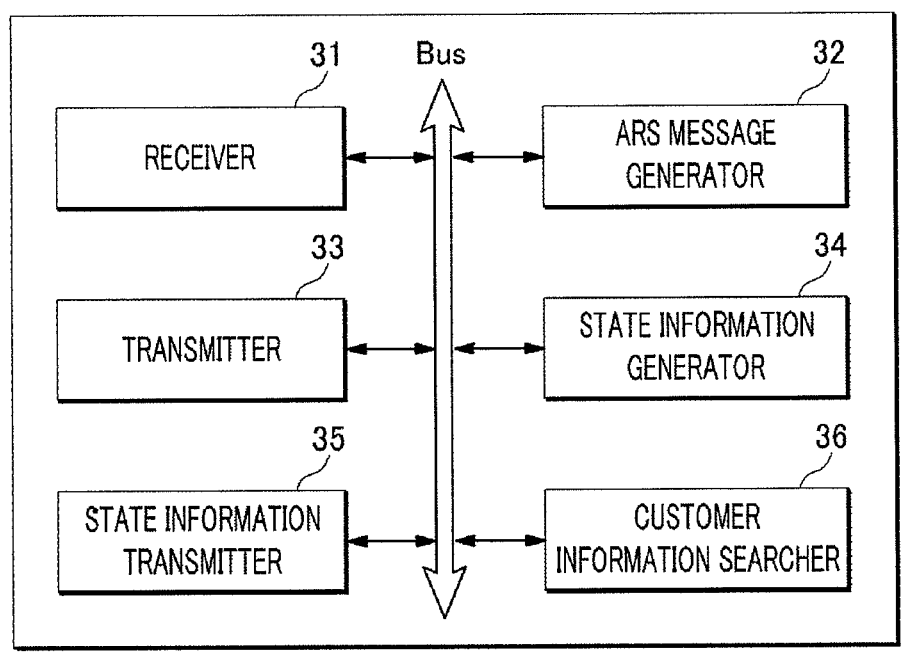
FIG. 2 is a configuration diagram of a messaging ARS server illustrated in FIG. 1.

FIG. 2 is a configuration diagram of the messaging ARS server 30 illustrated in FIG. 1. Referring to FIG. 1 and FIG. 2, the messaging ARS server 30 may include a reception unit 31, an ARS text message generation unit 32, a transmission unit 33, a state information generation unit 34, a state information transmission unit 35, and a customer information search unit 36.

The reception unit 31 receives the ARS request text message sent by the mobile device 10 from the message service center server 20. The ARS request text message includes the identification number of the messaging ARS server 30, and the ARS request text message may include keywords or numbers input from user interface, in addition to the identification number. Examples of the identification number may include newly created numbers or conventionally used main numbers like '1588-XXXX,' and the keywords or numbers may be characters such as '], r, and l.'

That is, the ARS request text message is transmitted from the message service center server 20 to the messaging ARS gateway 25, and the reception unit 31 receives the ARS request text message from the messaging ARS gateway 25. In this case, if the mobile device is a mobile device subscribed to a first service, the reception unit 31 may receive the ARS request text message from a first message service center corresponding to the first service.

The ARS text message generation unit 32 analyzes the ARS request text message received from the message service center server 20 and generates an ARS response text message including at least one automatic response menu text. In this case, the generated ARS response text message is a text message that can receive input of shortcut keys from user interface.

When the voice ARS service process is initiated, the ARS text message generation unit 32 may generate an ARS response text message including an automatic response main menu text. In addition, when receiving input of a shortcut key from user interface, the ARS text message generation unit 32 may generate an ARS response text message including an automatic response submenu text. In this case, the automatic response submenu text corresponds to the shortcut key input from the user interface.

The transmission unit 33 transmits the ARS response text message generated from the ARS text message generation unit 32 to the message service center server 20. In this case, the ARS response text message includes the identification number of the mobile device 10, and may be transmitted to the message service center server 20 through the messaging ARS gateway 25.

The state information generation unit 34 generates state information corresponding to one or more of the ARS request text message received from the mobile device 10 and the ARS response text message generated from the ARS text message generation unit 32. In this case, the state information generation unit 34 may generate the state information for an automatic response history from the messaging ARS server 30 to the mobile device 10 based on one or more of the ARS request text message received from the mobile device 10 and the ARS response text message generated from the ARS text message generation unit 32.

The state information transmission unit 35 transmits the state information generated from the state information generation unit 34 to the first apparatus of the voice ARS counseling system 2. When a voice ARS counseling button (e.g., a call button) is input from user interface during use of the messaging ARS service, namely, when the voice ARS service process is initiated from the mobile device 10, the first apparatus that has received the voice ARS counseling request signal may request state information from the state information transmission unit 35 in order to determine whether the first apparatus has requested voice ARS counseling during use of the messaging ARS, and the state information transmission unit 35 may transmit the requested state information to the first apparatus.

In addition, the state information transmission unit 35 may synchronize and transmit the state information generated from the messaging ARS server 30 to the first apparatus. This may further facilitate access to the state information from each server in the inside of the voice ARS counseling system 2.

The customer information search unit 36 may search the customer information of the mobile device 10 from the customer information management apparatus 55 of the voice ARS counseling system 2. When receiving an ARS request text message including a shortcut key from the mobile device 10, the ARS text message generation unit 32 requires the customer information of the user of the mobile device 10 in order to generate an ARS response message. The customer information search unit 36 may search the customer information included in the customer information management apparatus 55 based on the identification number of the mobile device 10 included in the ARS request message. Examples for the customer information may include at least one of a device type, a membership level, a rate plan, user personal information, a password, nonpayment information and billing with respect to the user of the mobile device.

Figure 3:
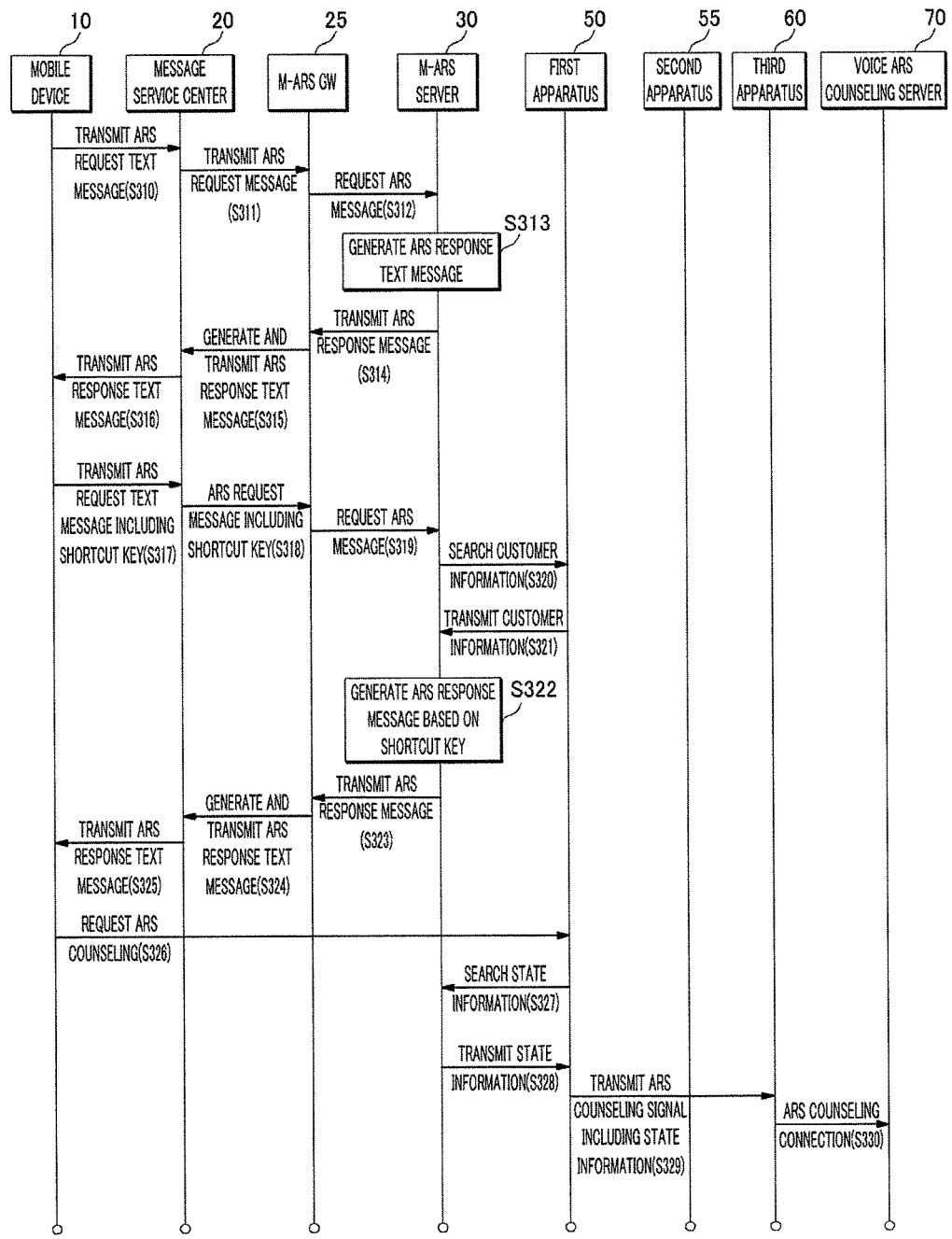
FIG. 3 is a flow diagram showing an example for a process, in which an ARS text message is transmitted and received by each component included in the ARS text message providing system of FIG. 1.

FIG. 3 is a flow diagram showing an example for a process, in which an ARS text message is transmitted and received by each component included in the ARS text message providing system of FIG. 1. Hereinafter, an example for a process, in which an ARS text message is transmitted and received in the case where the messaging ARS server 30 includes state information, in accordance with an example embodiment is described with reference to FIG. 3, but the present disclosure is not limited to the example embodiment. The depiction in FIG. 3 corresponds to the first example embodiment described above referring to FIG. 1.

Referring to FIG. 3, the mobile device 30 transmits the ARS request text message including the identification number of the messaging ARS server 30 to the message service center server 20 (S310). The message service center server 20 transmits the ARS request message to the messaging ARS gateway 25 (5311). The messaging ARS gateway 25 requests an ARS message from the messaging ARS server 30 (S312). The messaging ARS server 30 generates an ARS response text message including a main menu (S313). The messaging ARS server 30 transmits the generated ARS response text message that includes the identification number of the mobile device 10 to the messaging ARS gateway 25 (S314).

The messaging ARS gateway 25 transmits the ARS response text message to the message service center server 20 (S315). The message service center server 20 transmits the ARS response text message to the mobile device 10 (S316). The mobile device 10 selects a shortcut key from the received ARS response text message, and transmits an ARS request text message including the shortcut key to the message service center server 20 (S317).

The message service center server 20 transmits the ARS request message including the shortcut key to the messaging ARS gateway 25 (S318). The messaging ARS gateway 25 requests an ARS message from the messaging ARS server 30 (S319). The messaging ARS server 30 requests search of customer information from the customer information management apparatus 55 based on the identification number of the mobile device 10 (S320). The customer information management apparatus 55 transmits the searched customer information to the messaging ARS server 30 (5321). The messaging ARS server 30 generates a response text message including an automatic response menu text corresponding to the shortcut key (S322).

The messaging ARS server 30 transmits the generated ARS response text message to the messaging ARS gateway 25 (S323). The messaging ARS gateway 25 transmits the ARS response text message to the message service center server 20 (S324). The message service center server 20 transmits the ARS response text message to the mobile device 10 (S325). The mobile device 10 receives input of a call button from the user interface, and requests voice ARS counseling from the IVR apparatus 50 (S326). When receiving the ARS counseling request signal, the IVR apparatus 50 requests search of state information from the messaging ARS server 30 (5327). The messaging ARS server 30 transmits the searched state information to the IVR apparatus 50 (S328). The IVR apparatus 50 transmits the voice ARS counseling request signal based on the state information and the customer information to the CTI apparatus 60 (S329). The CTI apparatus 60 transmits the customer information to the voice ARS counseling server 70, and connects the mobile device 10 and the voice ARS counseling server 70 to each other through the exchange server 45 (S330).

Figure 4:
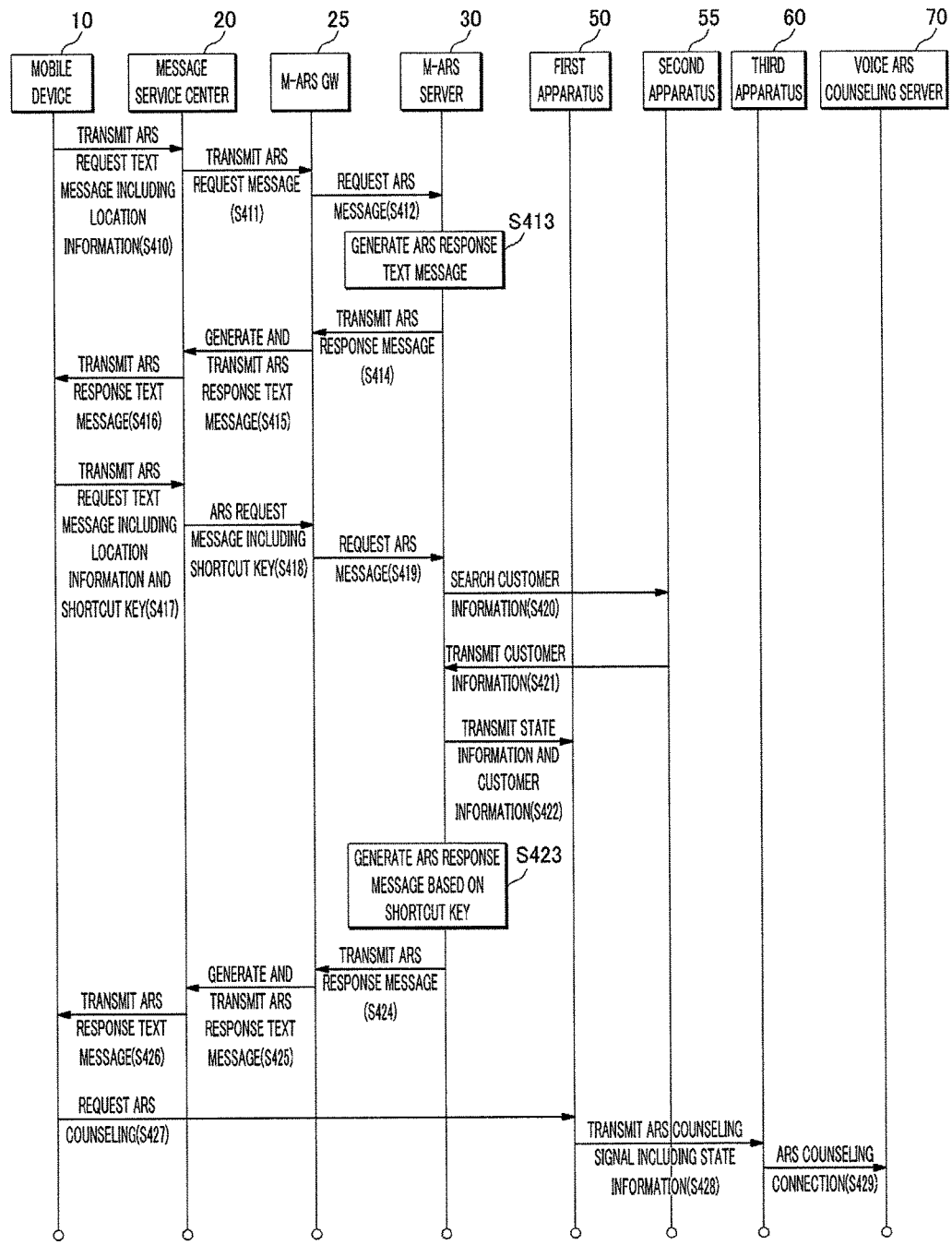
FIG. 4 is a flow diagram showing another example for a process, in which an ARS text message is transmitted and received by each component included in the ARS text message providing system of FIG. 1.

FIG. 4 is a flow diagram showing another example for a process, in which an ARS text message is transmitted and received by each component included in the ARS text message providing system of FIG. 1. The depiction of FIG. 4 corresponds to the second example embodiment described above referring to FIG. 1.

Referring to FIG. 4, the mobile device 10 transmits an ARS request text message including an identification number and location information of the messaging ARS server to the message service center server 20 (S410). The message service center server 20 transmits the ARS request message to the messaging ARS gateway 25 (S411). The messaging ARS gateway 25 requests an ARS message from the messaging ARS server 30 (S412). The messaging ARS server 30 generates an ARS response text message including a main menu (S413). The messaging ARS server 30 transmits the generated ARS response text message that includes the identification number of the mobile device 10 to the messaging ARS gateway 25 (S414).

The messaging ARS gateway 25 transmits the ARS response text message to the message service center server 20 (5415). The message service center server 20 transmits the ARS response text message to the mobile device 10 (S416). The mobile device 10 selects a shortcut key from the received ARS response text message, and transmits an ARS request text message including the shortcut key and location information to the message service center server 20 (S417). The message service center server 20 transmits the ARS request message including the shortcut key to the messaging ARS gateway 25 (S418).

The messaging ARS gateway 25 requests an ARS message from the messaging ARS server 30 (S419). The messaging ARS server 30 requests search of customer information from the customer information management apparatus 55 based on the identification number of the mobile device 10 (S420). The customer information management apparatus 55 transmits the searched customer information to the managing ARS server 30 (S421). The messaging ARS server 30 synchronizes and transmits the state information and the customer information to the IVR apparatus 50 (5422). The messaging ARS server 30 generates a response text message including an automatic response menu text corresponding to the shortcut key (5423). The messaging ARS server 30 transmits the generated ARS response text message to the messaging ARS gateway 25 (5424). The messaging ARS gateway 25 transmits the ARS response text message to the message service center server 20 (S425). The message service center server 20 transmits the ARS response text message to the mobile device 10 (S426). The mobile device 10 receives input of a messaging ARS identification number (e.g., a voice ARS service number) and a call button from the user interface to request a voice call, and a signal for the requested voice call is delivered to the IVR apparatus 50 synchronized for state information within the voice ARS counseling system 2 of a corresponding area via a corresponding local exchanger within a mobile communication network (S427). The IVR apparatus 50 determines whether the user who has requested the voice ARS service has been using the messaging ARS service and transmits a voice ARS counseling signal based on state information and customer information to the CTI apparatus 60 (S428). The CTI apparatus 60 transmits the customer information to the voice ARS counseling server 70, and connects the mobile device 10 and the voice ARS counseling server 70 to each other through the exchanger server 45 (S429).

Figure 5:
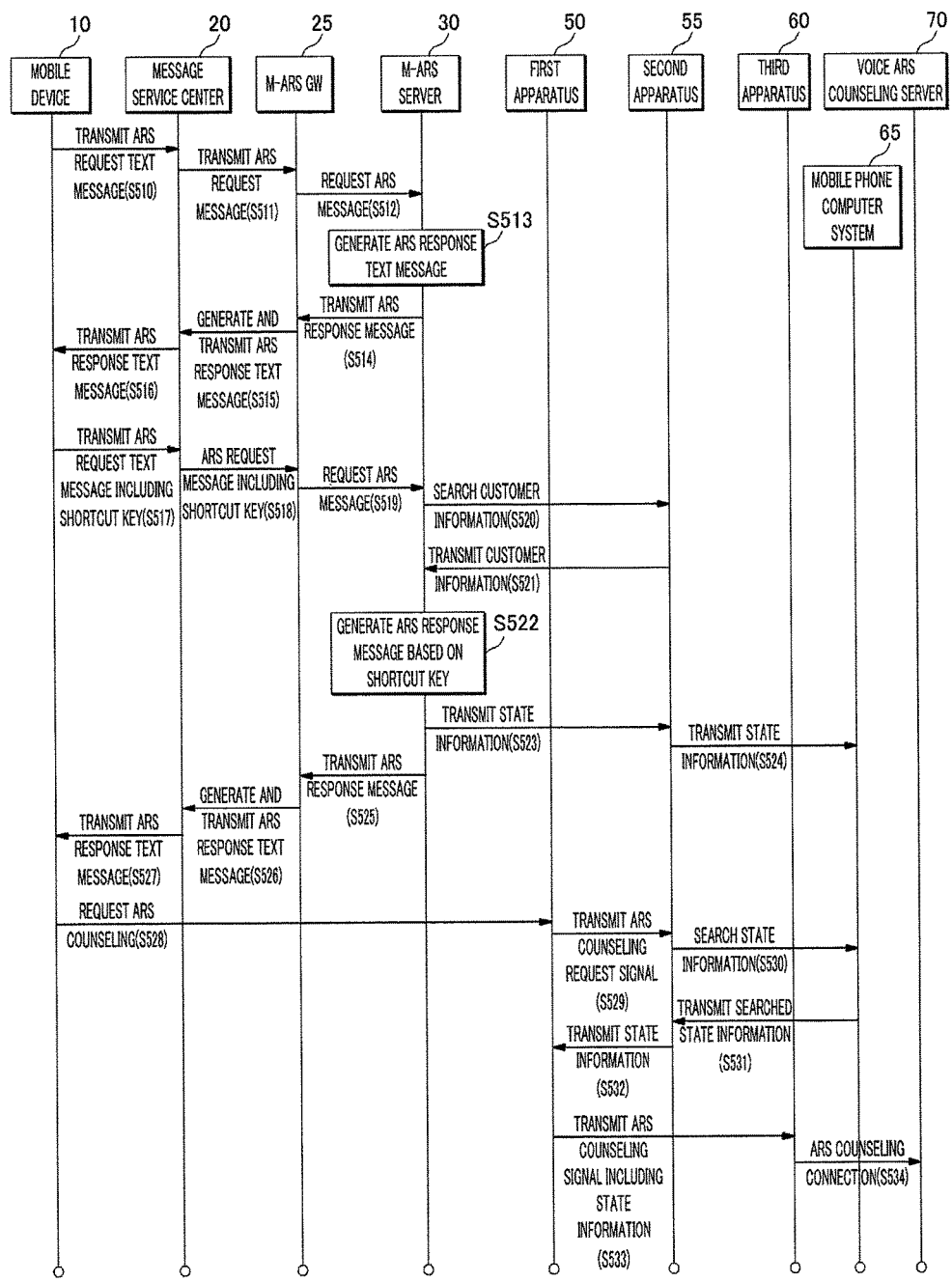
FIG. 5 is a flow diagram showing another example for a process, in which an ARS text message is transmitted and received by each component included in the ARS text message providing system of FIG. 1.

FIG. 5 is a flow diagram showing another example for a process, in which an ARS text message is transmitted and received by each component included in the ARS text message providing system of FIG. 1. The depiction of FIG. 5 corresponds to the third example embodiment described above referring to FIG. 1.

Referring to FIG. 5, the mobile device 10 transmits the ARS request text message including the identification number of the messaging ARS server to the message service center server 20 (S510). The message service center server 20 transmits the ARS request message to the messaging ARS gateway 25 (S511). The messaging ARS gateway 25 requests an ARS message from the messaging ARS server 30 (S512). The messaging ARS server 30 generates an ARS response text message including a main menu (5513).

The messaging ARS server 30 transmits the generated ARS response text message including the identification number of the mobile device 10 to the messaging ARS gateway 25 (S514). The messaging ARS gateway 25 delivers the ARS response text message to the message service center server 20 (S515). The message service center server 20 transmits the ARS response text message to the mobile device 10 (5516). The mobile device 10 selects a shortcut key from the received ARS response text message, and transmits an ARS request text message including the shortcut key to the message service center server 20 (5517).

The message service center server 20 transmits the ARS request message including the shortcut key to the messaging ARS gateway 25 (S518). The messaging ARS gateway 25 requests an ARS message from the messaging ARS server 30 (5519). The messaging ARS server 30 requests search of customer information from the customer information management apparatus 55 based on the identification number of the mobile device 10 (S520). The customer information management apparatus 55 transmits the searched customer information to the messaging ARS server 30 (S521). The messaging ARS server 30 generates a response text message including an automatic response menu text corresponding to the shortcut key (S522).

The messaging ARS server 30 transmits the state information included in a database to the customer information management apparatus 55 (S523). The messaging ARS server 30 delivers the state information to the mobile phone computer server 65 through the customer information management apparatus 55 (S524). The messaging ARS server 30 transmits the generated ARS response message to the messaging ARS gateway 25 (S525). The messaging ARS gateway 25 transmits the ARS response text message to the message service center server 20 (S526). The message service center server 20 transmits the ARS response text message to the mobile device 10 (S527). The mobile device 10 receives input of an identification number and a call button of messaging ARS from the user interface to request voice ARS from the voice ARS counseling system 2 (S528). The IVR apparatus 50 transmits an ARS counseling signal to the customer information management apparatus 55 in response to the introduced ARS counseling request signal (S529). The customer information management apparatus 55 request search of state information from the mobile phone computer server 65 (S530). The mobile phone computer server 65 transmits the searched state information to the customer information management apparatus 55 (S531). The customer information management apparatus 55 transmits the state' information to the IVR apparatus 50 (S532). The IVR apparatus 50 transmits an ARS counseling signal including the state information and the customer information to the CTI apparatus 60 (S533). The CTI apparatus 60 transmits the customer information to the voice ARS counseling server 70, and connects the mobile device 10 and the voice ARS counseling server 70 to each other through the exchange server 45 (S534).

Figure 6:
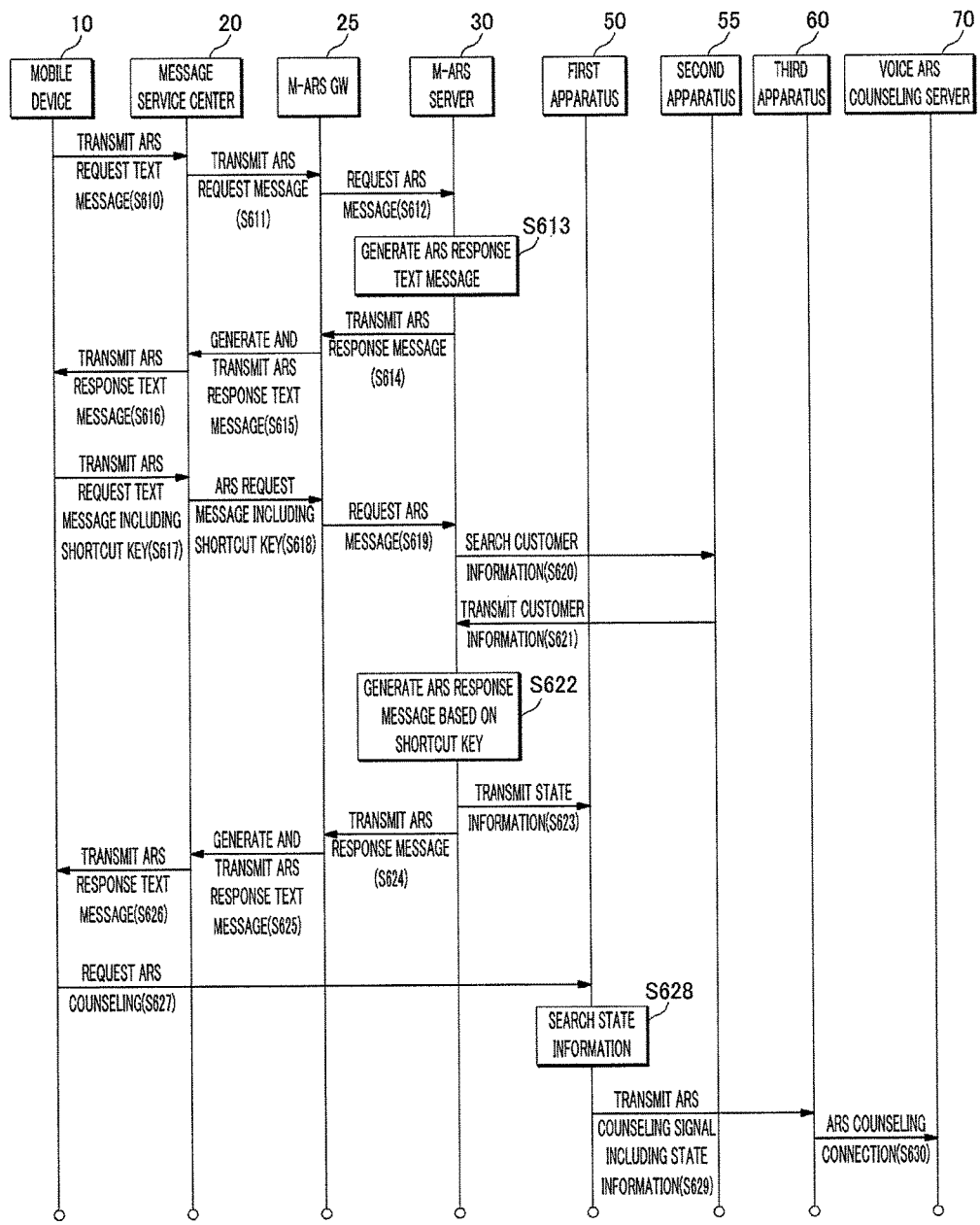
FIG. 6 is a flow diagram showing another example for a process, in which an ARS text message is transmitted and received by each component included in the ARS text message providing system of FIG. 1.

FIG. 6 is a flow diagram showing another example for a process, in which an ARS text message is transmitted and received by each component included in the ARS text message providing system of FIG. 1. The depiction of FIG. 6 corresponds to the fourth example embodiment described above referring to FIG. 1.

Referring to FIG. 6, the mobile device 10 transmits the ARS request text message including the identification number of the messaging ARS server 30 to the message service center server 20 (S610). The message service center server 20 transmits the ARS request message to the messaging ARS gateway 25 (S611). The messaging ARS gateway 25 requests an ARS message from the messaging ARS server 30 (S612). The messaging ARS server 30 generates an ARS response text message including a main menu (5613).

The messaging ARS server 30 transmits the generated ARS response text message that includes the identification number of the mobile device 10 to the messaging ARS gateway 25 (S614). The messaging ARS gateway 25 transmits the ARS response text message to the message service center server 20 (S615). The message service center server 20 transmits the ARS response text message to the mobile device 10 (S616). The mobile device 10 selects a shortcut key from the received ARS response text message, and transmits an ARS request text message including the shortcut key to the message service center server 20 (S617).

The message service center server 20 transmits the ARS request message including the shortcut key to the message ARS gateway 25 (S618). The messaging ARS gateway 25 requests an ARS message from the messaging ARS server 30 (S619). The messaging ARS server 30 requests search of customer information from the customer information management apparatus 55 based on the identification number of the mobile device 10 (S620). The customer information management apparatus 55 transmits the searched customer information to the messaging ARS server 30 (S621). The messaging ARS server 30 generates a response message including an automatic response menu text corresponding to the shortcut key (S622). The messaging ARS server 30 transmits the state information to all the IVR apparatuses 50 (S623). The messaging ARS server 30 transmits the generated ARS response text message to the messaging ARS gateway 25 (S624).

The messaging ARS gateway 25 delivers the ARS response text message to the message service center server 20 (S625). The message service center server 20 transmits the ARS response text message to the mobile 10 (5626). When the mobile device 10 receives input of an identification number and a call button of the voice ARS counseling system 2 from the user interface, the mobile device 10 attempts voice call connection to the voice ARS counseling system 2, and the voice ARS request signal is delivered to the IVR apparatus 50 within the voice ARS counseling system of the corresponding area (5627). The IVR apparatus 50 within the corresponding voice ARS counseling system searches state information in the database (5628). The IVR apparatus 50 transmits an ARS counseling signal based on the state information and the customer information to the CTI apparatus 60 (S629). The CTI apparatus 60 transmits the customer information to the voice ARS counseling server 70, and connects the mobile device 10 and the voice ARS counseling server 70 to each other through the exchange server 45 (S630).

FIG. 7a to FIG. 7l show examples for graphic interface displayed on a display of the mobile device.

Figure 7A:
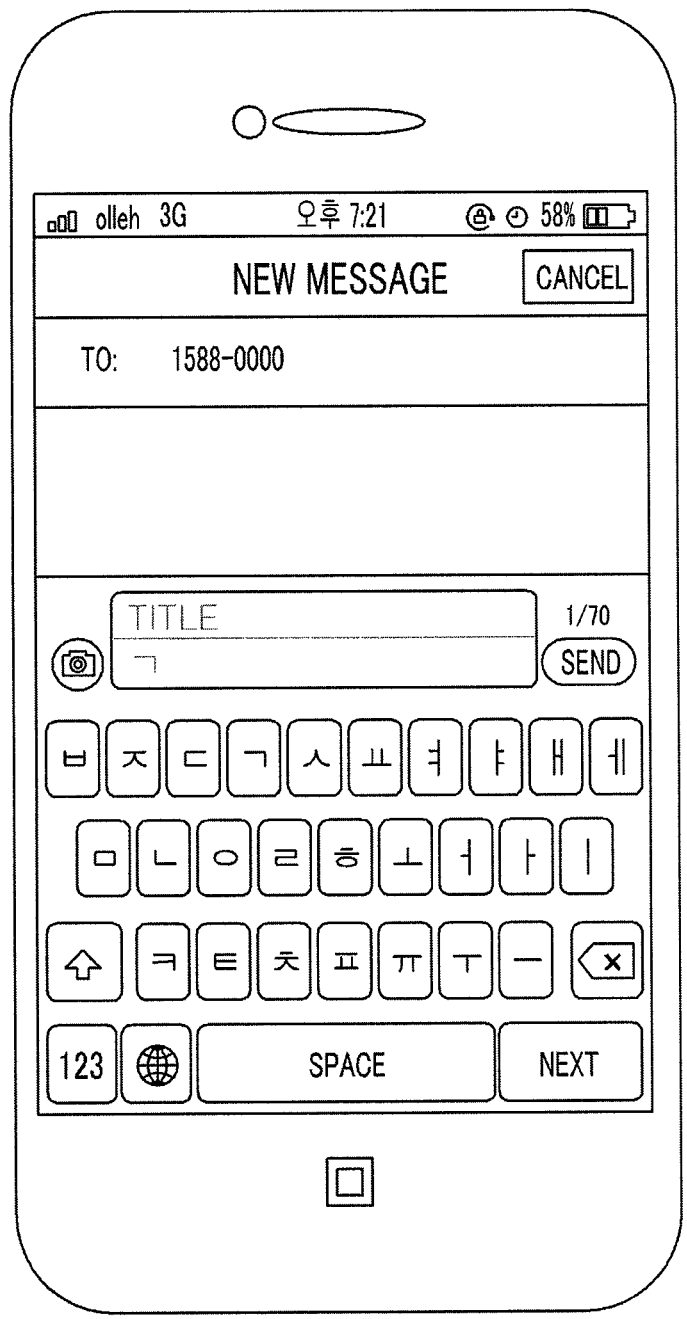
FIG. 7a to FIG. 7l show examples for graphic interface displayed on a display of a mobile device.

Referring to FIG. 7a, the mobile device 10 receives the identification number of the messaging ARS server 30 as a receiver from the user interface in order to request a voice ARS text message. The mobile device 10 may receive input of at least one of a keyword and a number from the user interface on a text window, and an example for the keyword or number is a character like "], r, or 3." In this case, the keyword or number refers to any character that can be input on a mobile device. The mobile device 10 transmits an ARS request text message including the identification number and the keyword or number of the messaging ARS server 30 to the messaging ARS server 30.

Figure 7B:
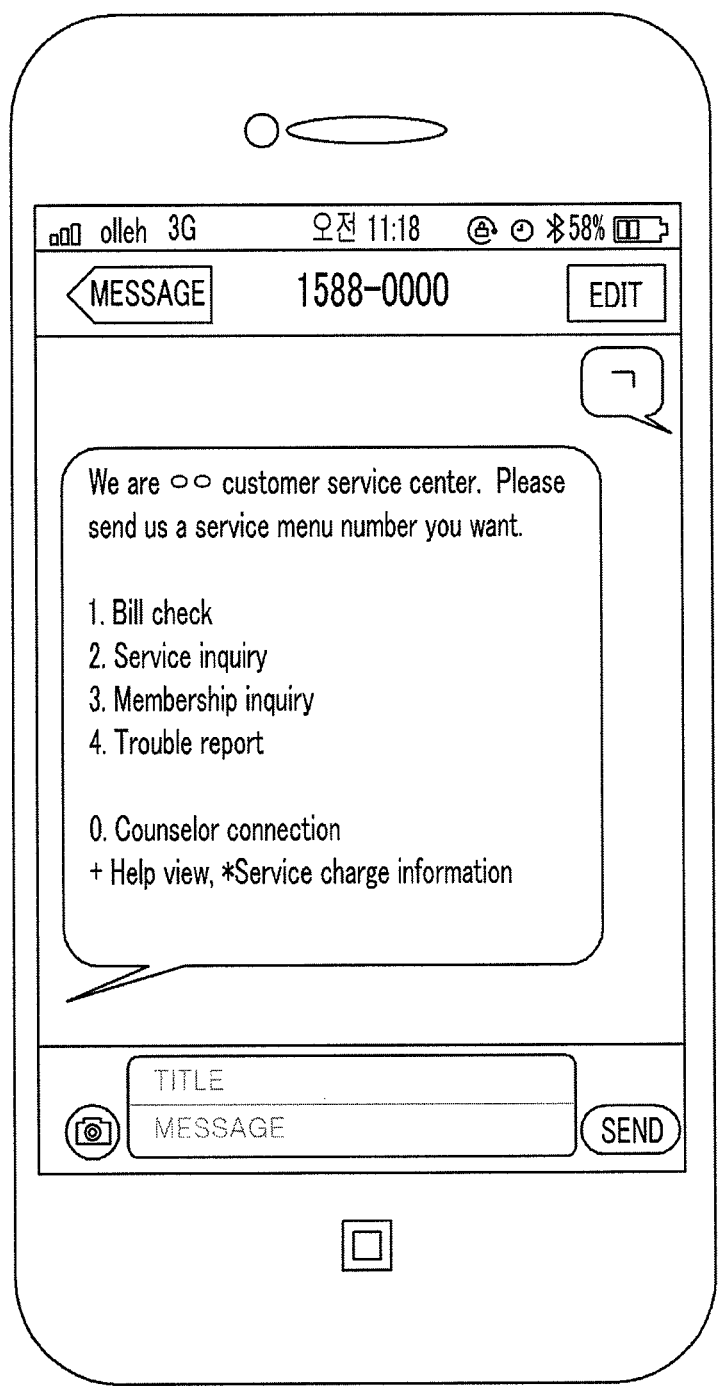

Referring to FIG. 7b, the mobile device 10 transmits the ARS request text message and displays an ARS response text message including an automatic response main menu text received from the messaging ARS server 30. The messaging ARS server 30 transmits the ARS response text message including the identification number of the mobile device 10 to the mobile device 10 in order to initiate the voice ARS counseling system.

In this case, the ARS response text message is generated based on the keyword or number of the ARS request message. For example, if a certain shortcut key exists in the ARS request message, the messaging ARS server 30 may transmit a page corresponding to the shortcut key to the mobile device 10. For another example, if a certain keyword exists in the ARS request message, the messaging ARS server 30 may transmit a menu corresponding to the keyword to the mobile device 10. For another example, if a character rather than a certain keyword or a shortcut key exists in the ARS request message, the messaging ARS server 30 may transmit a main menu to the mobile device 10. In this case, the main menu of the ARS response text message includes at least one of a fee inquiry, a membership inquiry, a trouble report, counselor connection, help view, and service fee information.

Figure 7C:
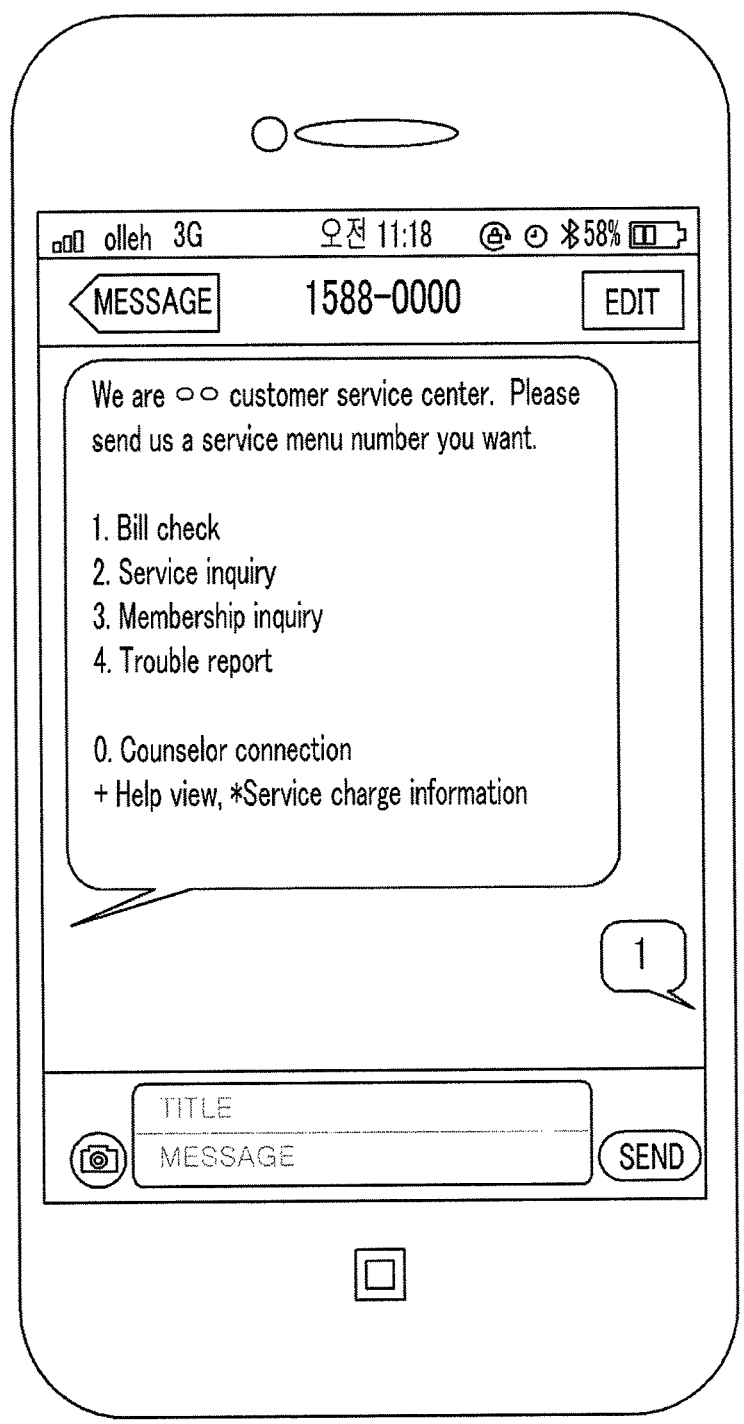

Referring to FIG. 7c, the mobile device 10 receives input of a certain shortcut key from the user interface, and transmits an ARS request text message to the messaging ARS server. The mobile device 10 transmits the ARS request text message including the identification number of the messaging ARS server 30 and the shortcut key to the messaging ARS server 30.

Figure 7D:
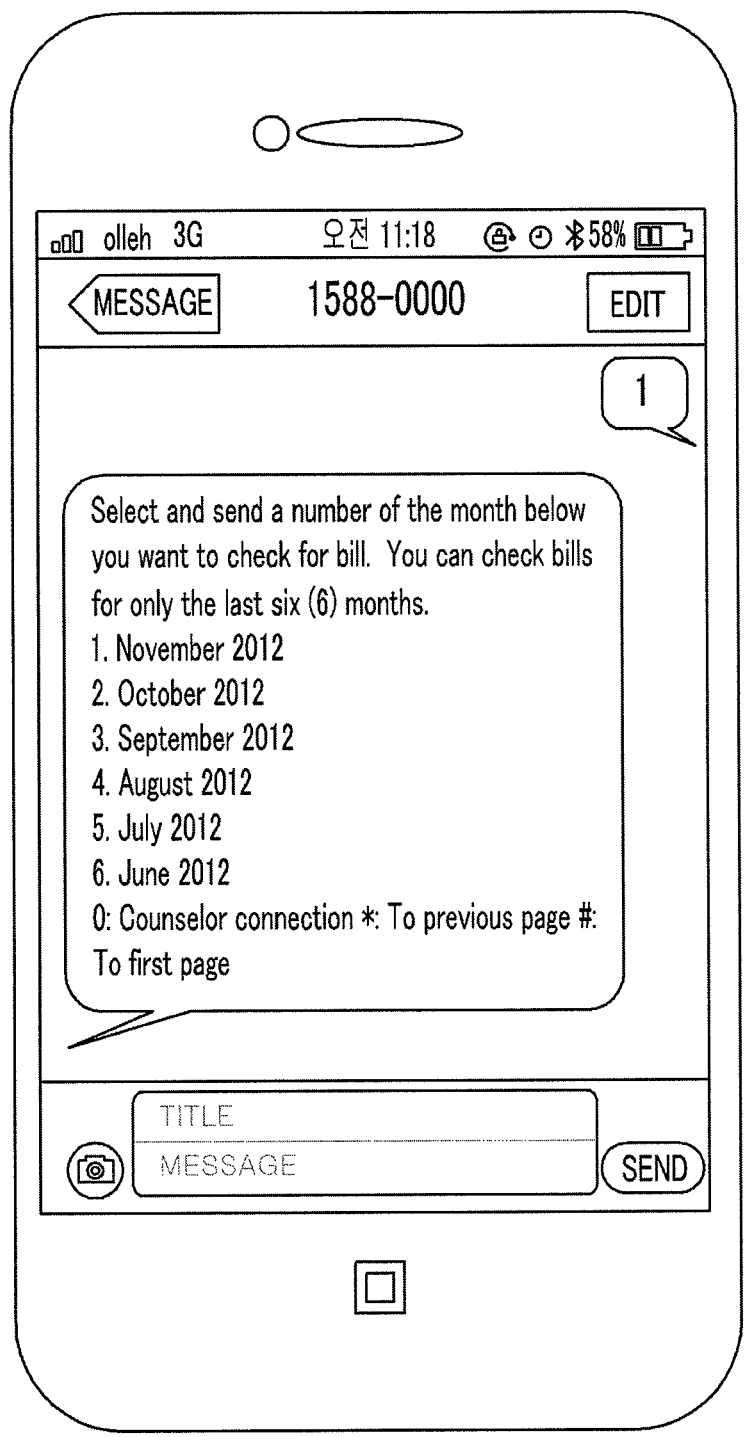

Referring to FIG. 7d, the messaging ARS server 30 generates an ARS response text message corresponding to the shortcut key, and the mobile device 10 receives the generated ARS response text message from the messaging ARS server 30 to display the message. The ARS response text message is generated based on the customer information of the user of the mobile device 10. For example, it is assumed that the user interface inputs the shortcut key '1,' which corresponds to a fee inquiry in a main menu in order to request a fee inquiry. The messaging ARS server 30 searches the customer information of the mobile device 10 in order to generate an ARS response text message corresponding to '1,' and generates an ARS response text message based on the searched customer information to transmit the message to the mobile device 10. The ARS response text message may include at least one of six (6)-month bill check, counselor connection, and shortcut numbers for a previous page, a first page and a current page.

Figure 7E:
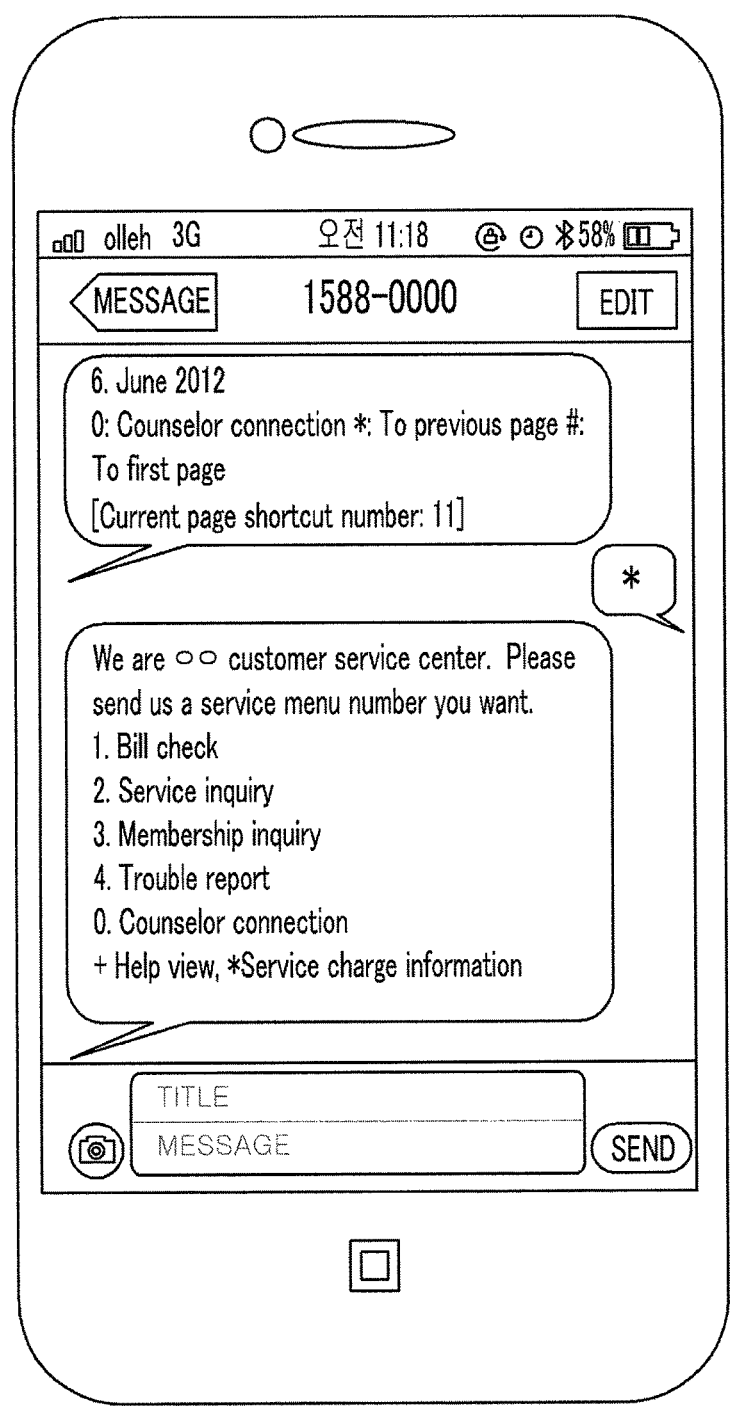

Referring to FIG. 7e, the mobile device 10 receives input of a shortcut key for requesting an automatic response previous menu text from the user interface. In this case, the shortcut key of the previous page may be, for example, a special character '*.'

Figure 7F:
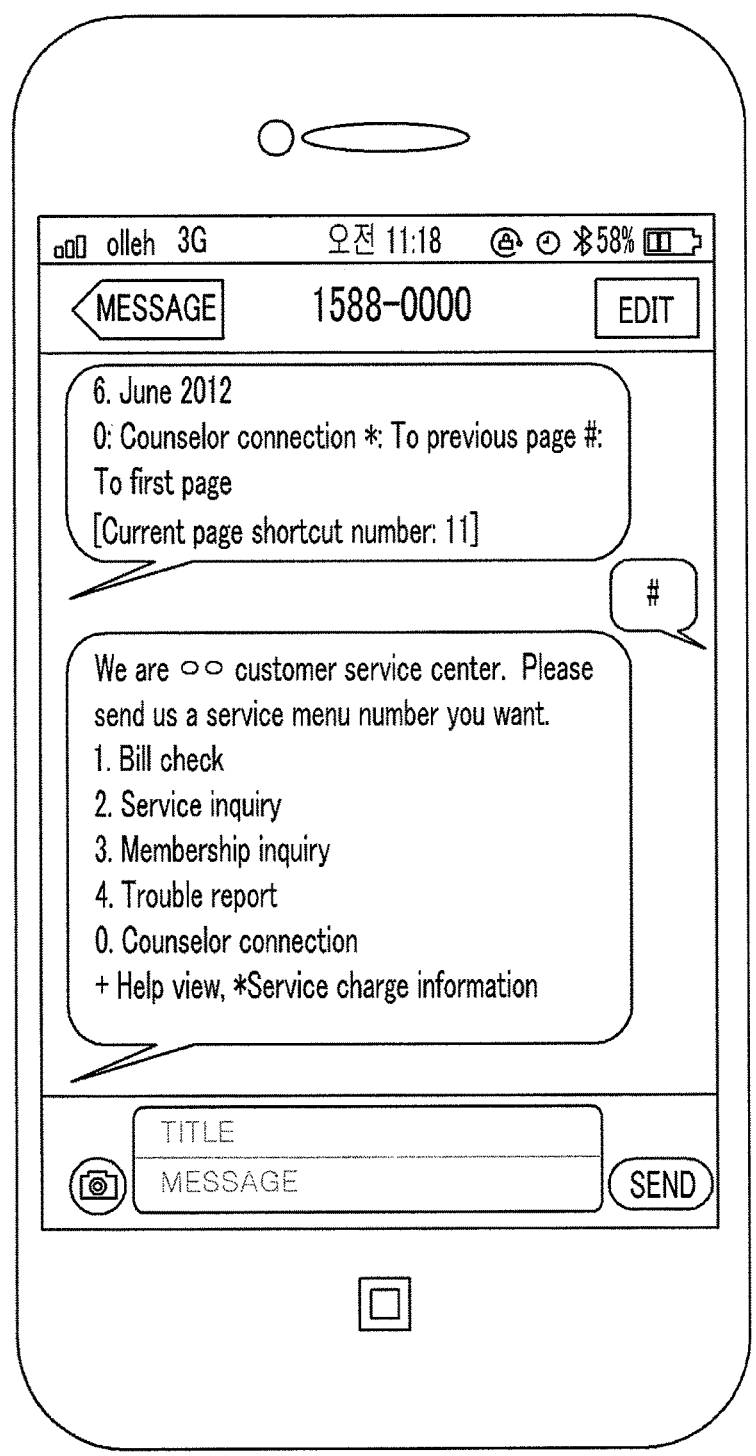

Referring to FIG. 7f, the mobile device 10 may receive input of a shortcut key for requesting an automatic response main menu text from the user interface. In this case, the shortcut key of the first page may be, for example, a special character like '#.'

Figure 7G:
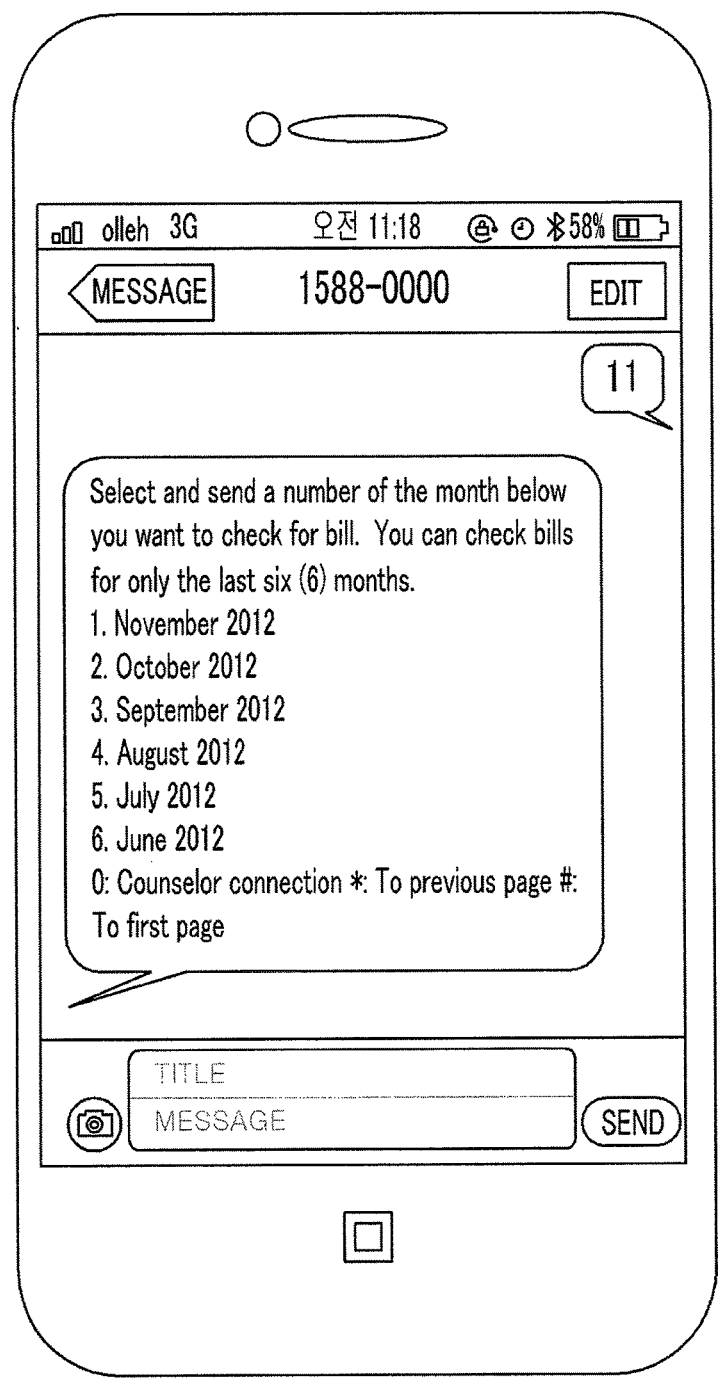

Referring to FIG. 7g, the mobile device 10 may receive input of a shortcut key for requesting a current page from the user interface. In this case, the shortcut key of the current page could have been automatically assigned from the messaging ARS server 30, and may be, for example, a certain shortcut key like '11.'

Figure 7H:
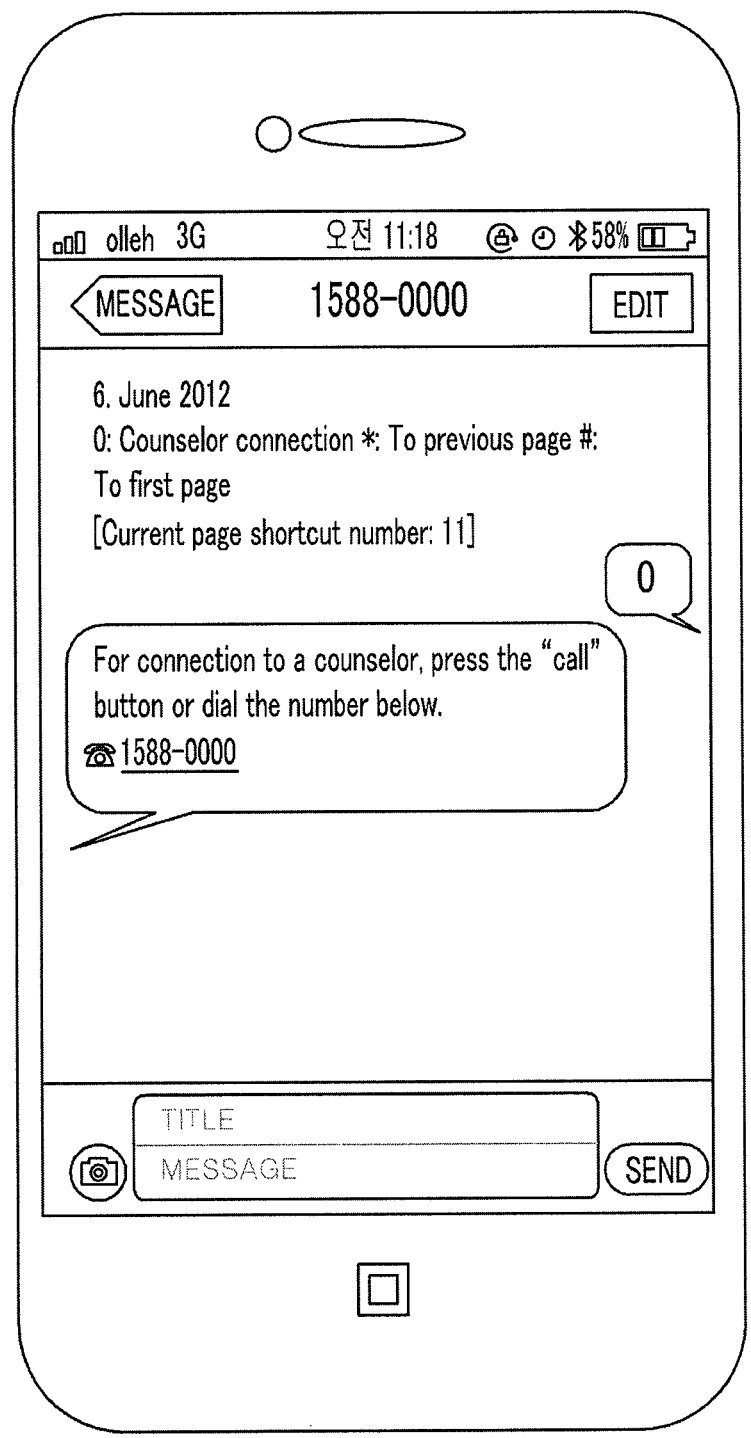

Referring to FIG. 7h, the mobile device 10 may receive input of a shortcut key for requesting voice ARS counseling from the user interface. In this case, the messaging ARS server 30 may transmit, to the mobile device 10, an ARS response text message including an identification number (e.g., 1588-XXXX) of the voice ARS counseling system 2 for connection to an ARS counselor. For example, the ARS response text message may be a message reading "Press the call button or call the following number to speak to a counselor." In this case, when receiving input of the call button or an identification number from the user interface, the mobile device 10 may be directly connected to a counselor through voice ARS.

Figure 7I:
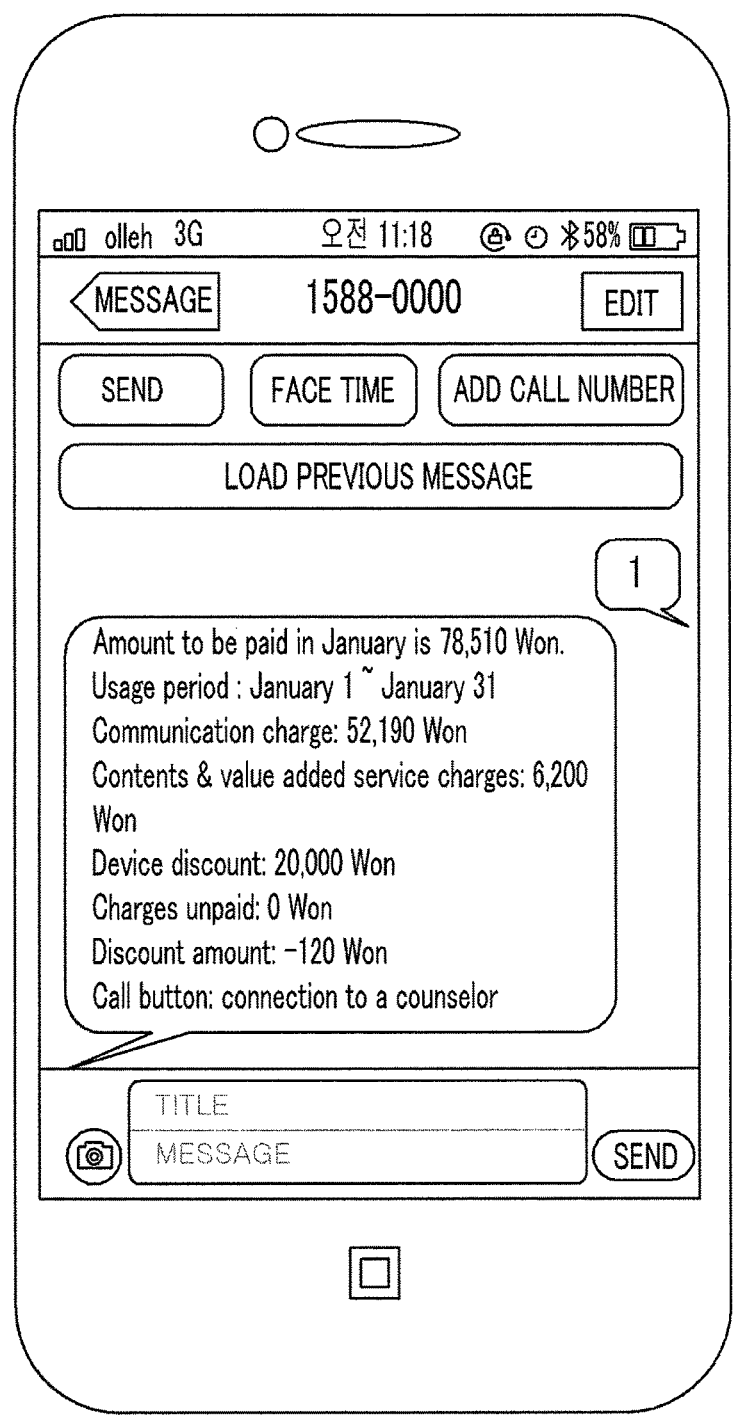
Figure 7J:
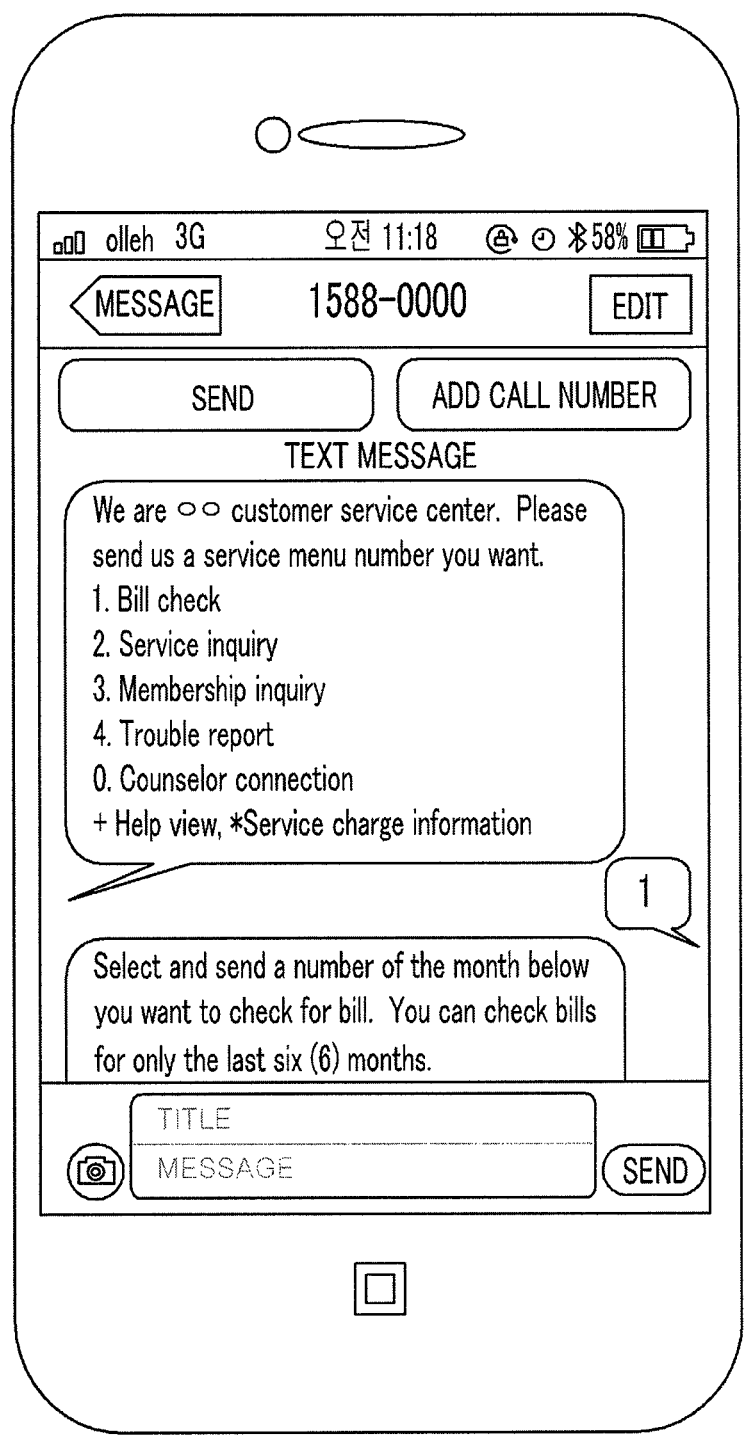

Referring to FIG. 7i, the messaging ARS server 30 may provide a function to connect a user to a voice ARS counselor when the user immediately presses a call key during use of text ARS without pressing a separate shortcut key for connection to a counselor. Referring to FIG. 7j, a call button may be input from the user interface while the user of the mobile device 10 is using the ARS text message providing system. In this case, the mobile device 10 may be connected to a counselor of the voice ARS counselor server 70 if a session with the messaging ARS server 30 is connected. When the ARS response message transmitted to the mobile device 10 is an automatic response final text, the messaging ARS server 30 may connect the mobile device 10 to a counselor handling a corresponding duty, and when the ARS response message is an automatic response menu text, the messaging ARS server 30 may connect the mobile device 10 to a common counselor. In addition, when the section with the messaging ARS server 30 is finished, the mobile device 10 may be connected to the voice ARS counseling system 2 through the second network 40.

Figure 7K:
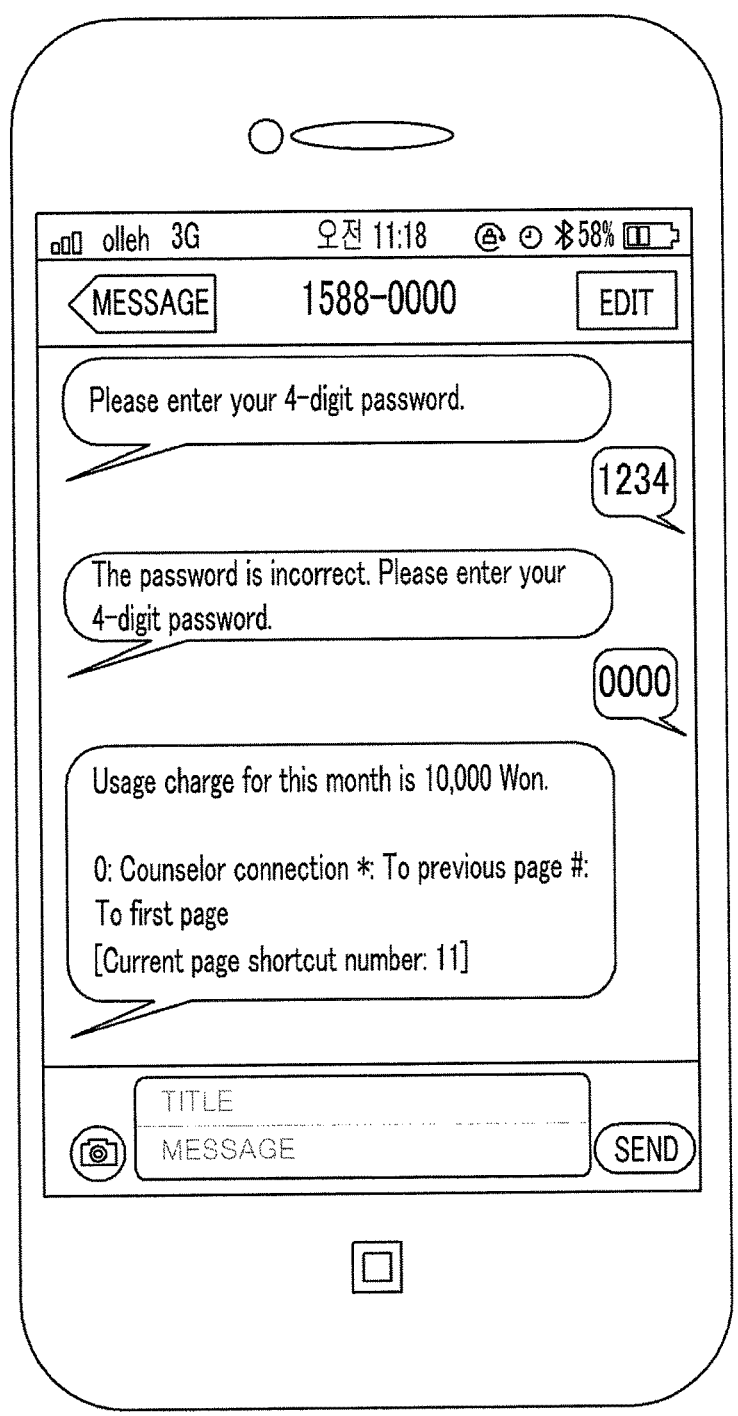

Referring to FIG. 7k, the mobile device 10 may receive input of a password from the user interface. In this case, the password is preset by the user interface, and the user interface inputs the password to perform user authentication to the messaging ARS server 30. The messaging ARS server 30 may generate an ARS response message based on the customer information through the authentication of the user of the mobile device 10 and transmit the message to the mobile device 10.

Figure 7L:
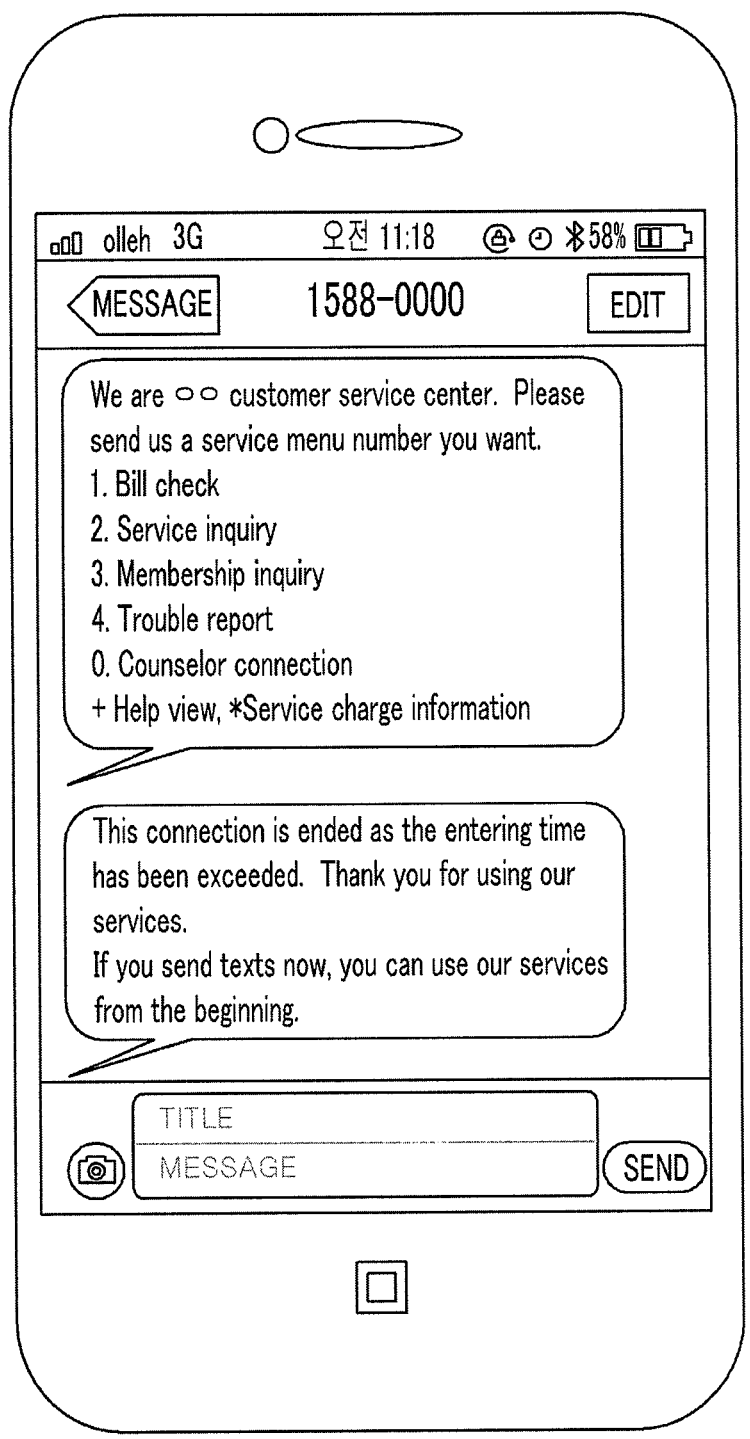

Referring to FIG. 7l, when the section with the messaging ARS server 30 is finished, the mobile device 10 may display texts. When no input is received from the user interface of the mobile device 10 for certain time, the messaging ARS server 30 may finish the section with the ARS text message providing system.

Figure 8:
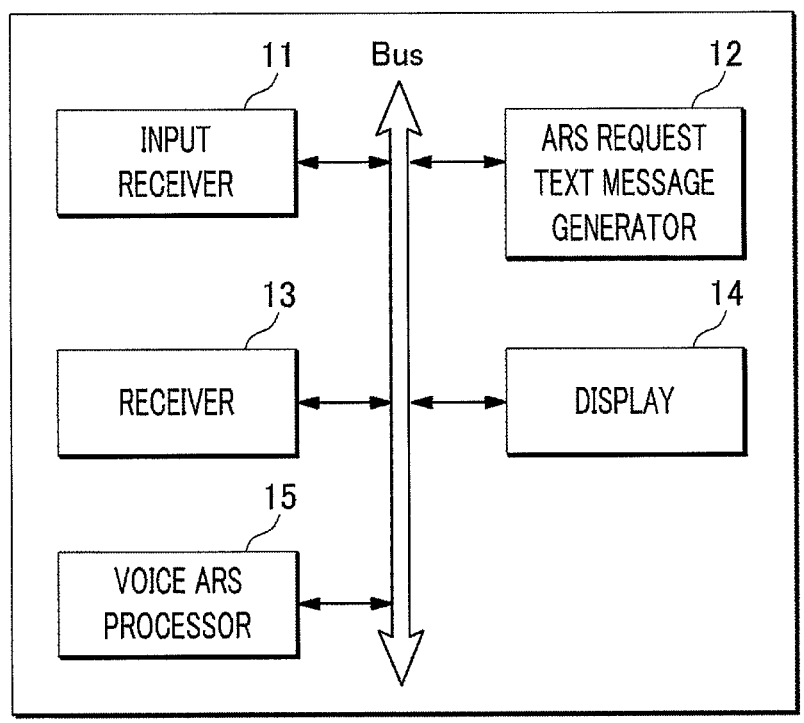
FIG. 8 is a configuration diagram of a mobile device illustrated in FIG. 1.

FIG. 8 is a configuration diagram of the mobile device 10 illustrated in FIG. 1. Referring to FIG. 1 and FIG. 8, the mobile device 10 may include an input unit 11, an ARS request text message generation unit 12, a reception unit 13, a display unit 14 and a voice ARS processing unit 15.

The input unit 11 receives input of the identification number of the messaging ARS server 30 through the user interface. The identification number may be, for example, '1588-XXXX.' In addition, the input unit 11 may receive input of characters such as keywords or numbers through the user interface. The characters may be, for example, "], r and l." In addition, the input unit 11 may receive input of a call button to connect the mobile device 10 and the voice ARS counseling server 70 to each other.

The ARS request text message generation unit 12 generates an ARS request text message based on the identification number input from the user interface. The ARS request text message generation unit 12 may generate a first ARS request text message based on the input identification number. In this case, the first ARS request text message may include characters such as keywords or numbers input from the user interface.

The reception unit 13 transmits the generated ARS request text message to the message service center server 20. In this case, the ARS request text message including the identification number and the characters may be delivered to the messaging ARS server 30 by the message service center server 20.

In addition, the reception unit 13 receives an ARS response text message including at least one automatic response menu text from the message service center server 20. In this case, the ARS response text message includes the identification number of the mobile device 10, and may be transmitted from the messaging ARS server 30 to the message service center server 20.

The display unit 14 displays the received automatic response menu text on a display of the mobile device.

The input unit 11 may receive input of a shortcut key corresponding to at least one automatic response menu text in order to access information that a user needs in the automatic response menu text displayed on the mobile display.

The ARS request text message generation unit 12 may generate a second ARS request text message corresponding to the input shortcut key. In this case, the second ARS request text message includes the identification number of the messaging ARS server 30.

The reception unit 13 may transmit the generated second ARS request text message to the message service center server 20, and the message service center server 20 may deliver the second ARS request text message to the messaging ARS server 30. In addition, the reception unit 13 may receive a second ARS response text message including the identification number of the mobile device 10 from the messaging ARS server 30.

When a button corresponding to voice ARS is selected through the user interface, the voice ARS processing unit 15 connects the mobile device to the voice ARS counseling system 2. The voice ARS processing unit 15 may receive ARS voice data corresponding to one or more of an ARS request text message and an ARS response text message from the voice ARS counseling system 2. In addition, the voice ARS processing unit 15 may receive, from the voice ARS counseling system 2, ARS voice data corresponding to one or more of the second ARS request text message generated from the ARS request text message generation unit 12 and the ARS response text message. In this case, the voice data are counselor's voice data corresponding to one or more of the ARS request text message and the ARS response text message.

Figure 9:
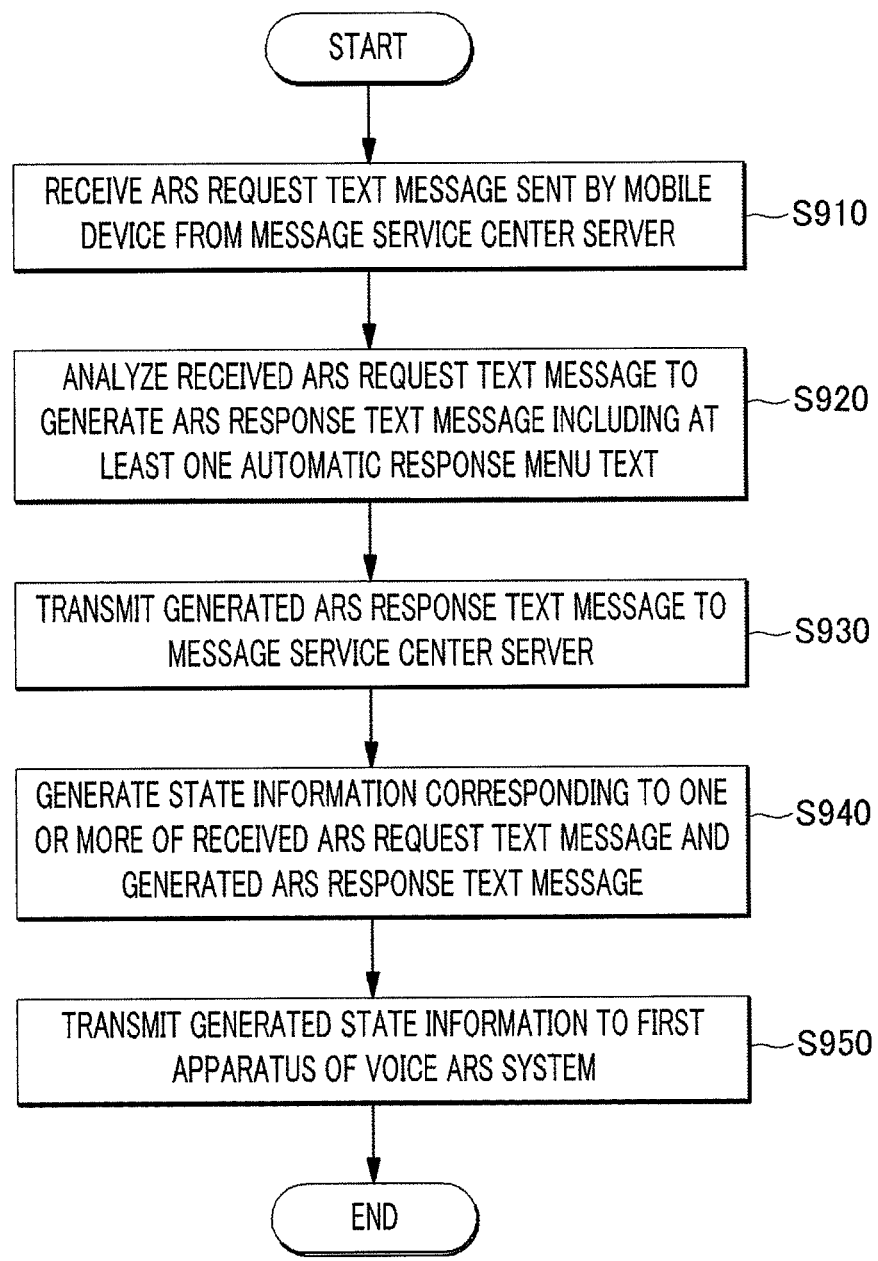
FIG. 9 is an operation flow chart of a method for transmitting and receiving an ARS text message in accordance with an example embodiment.

FIG. 9 is an operation flow diagram of a method for transmission and reception of an ARS text message in accordance with an example embodiment. The method for transmission and reception of an ARS text message in accordance with an example embodiment in FIG. 9 includes the processes sequentially processed in the messaging ARS server 30 illustrated in FIG. 2. Accordingly, the descriptions of the messaging ARS server 30 with reference to FIG. 2 to FIG. 8 are applied to FIG. 9, even though they are omitted hereinafter.

In 5910, the reception unit 31 of the messaging ARS server 30 receives the ARS request text message sent by the mobile device 10 from the message service center server 20. In 5920, the ARS text message generation unit 32 analyzes the received ARS request text message and generates an ARS response text message including at least one automatic response menu text. In S930, the transmission unit 33 transmits the generated ARS response text message to the message service center server 20. In 5940, the state information generation unit 34 generates state information corresponding to at least one of the received ARS request text message and the generated ARS response text message. In 5950, the transmission unit 33 transmits the produced state information to the first apparatus of the voice ARS system.

Figure 10:
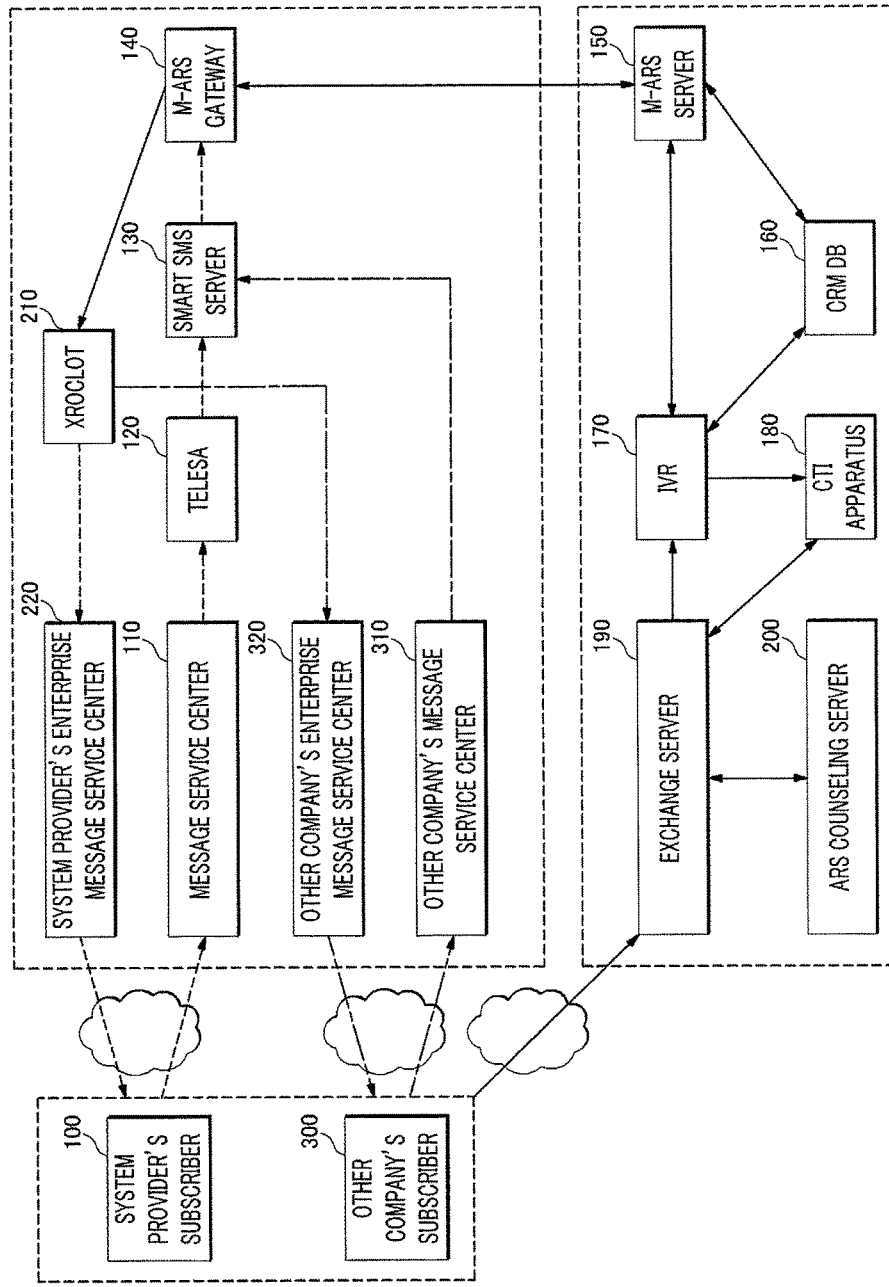
FIG. 10 is another example for a process, in which an ARS text message is transmitted and received by each component included in the ARS text message providing system of FIG. 1.

FIG. 10 shows another example for a process, in which an ARS text message is transmitted and received by each component included in the ARS text message providing system of FIG. 1. In this case, the messaging ARS server 150 of FIG. 10 may be included in the voice ARS counseling system, and the messaging ARS gateway 140 may be included in the messaging ARS system.

When the messaging ARS system receives a request for ARS counseling from its provider's subscriber 100, the provider's subscriber 100 transmits an ARS request message to the message service center 110 through a network. The message service center 110 transmits the received ARS request message to the messaging ARS gateway 140 through a smart SMS server 130.

When the messaging ARS system receives a request for ARS counseling from other company's subscriber 300, the other company's subscriber 300 transmits an ARS request message to the other company's service center 310 through a network. The other company's message service center 310 transmits the received ARS request message to the messaging ARS gateway 140 through the smart SMS server 13.

When the messaging ARS gateway 140 transmits the ARS request text message to the messaging ARS server 150, the messaging ARS server 150 generates an ARS response text message corresponding to the ARS request text message. The messaging ARS server 150 requests search of customer information from CRM DB 160, and generates the ARS response text message based on the searched customer information. The messaging ARS server 150 transmits the generated ARS response text message to the messaging ARS gateway 140. The messaging ARS gateway 140 transmits the received ARS response text message to Xroshot 210. Xroshot 210 is a server that can convert messages to transmit them in bulk, and integrate and store various types of messages such as voice, faxes, text messages and e-mails so as to enable exchange of messages through only one ID anywhere and anytime, regardless of types of terminals.

When the transmitter of the ARS request text message is the system provider's subscriber 100, Xroxhot 210 transmits the ARS response text message to the provider's enterprise message service center 220, and the provider's enterprise message service center 220 transmits the ARS response text message to the provider's subscriber 100 through a network.

When the transmitter of the ARS request text message is other company's subscriber 300, Xroshot 210 transmits the ARS response text message to the other company's enterprise message service center 320, and the other company's enterprise message service center 320 transmits the ARS response text message to the other company's subscriber 300 through a network.

Referring to FIG. 10, there may be various example embodiments for the voice ARS counseling system 2 depending on an operating subject of the ARS counseling system including state information.

In accordance with a fifth example embodiment, when receiving a voice ARS counseling request signal from the system provider's subscriber 100 or other company's subscriber 300, the messaging ARS server 150 transmits the voice ARS counseling request signal to the IVR apparatus 170. The IVR apparatus 170 requests search of state information from the messaging ARS server 150, and the messaging ARS server 150 transmits the state information to the IVR apparatus 170. In addition, the IVR apparatus 170 may request and receive customer information from CRM DB 160. The IVR apparatus 170 transmits the ARS counseling request signal, the state information and the customer information to the CTI apparatus 180. The CTI apparatus 180 searches an available counselor within the counseling group, and transmits the customer information to the voice ARS counseling server 200. In this case, the CTI apparatus 180 instructs the exchange server 190 to connect the searched counselor to the system provider's subscriber 100 or other company's subscriber 300.

In accordance with a sixth example embodiment, the messaging ARS server 150 synchronizes and transmits, to CRD DB 180, state information for an automatic response history to the mobile device based on one or more of the received ARS request text message and the generated ARS response text message.

When the voice ARS service process is initiated from the system provider's subscriber 100 or other company's subscriber 300, the messaging ARS server 150 transmits a voice ARS counseling request signal to CRM DB 180. CRM DB 180 internally searches state information and transmits the state information to the IVR apparatus 170.

The IVR apparatus 170 transmits the state information and the customer information that have been received from CRM DB 160 to the CTI apparatus 180. The CTI apparatus 180 searches an available counselor within the counseling group, and transmits the customer information to the voice ARS counseling server 200. In this case, the CTI apparatus 180 instructs the exchange server 190 to connect the searched counselor to the system provider's subscriber 100 or other company's subscriber 300.

In accordance with a seventh example embodiment, the messaging ARS server 150 synchronizes and transmits, to the IVR apparatus 170, state information for an automatic response history to the mobile device based on one or more of the received ARS request text message and the generated ARS response text message.

When the voice ARS service process is initiated from the system provider's subscriber 100 or other company's subscriber 300, the messaging ARS server 150 transmits a voice ARS counseling request signal to the IVR apparatus 170, and the IVR apparatus 170 internally searches state information.

The IVR apparatus 170 may request and receive customer information from CRM DB 160. The IVR apparatus 170 transmits the voice ARS counseling request signal, the state information and the customer information to the CTI apparatus 180. The CTI apparatus 180 searches an available counselor within the counseling group and transmits the customer information to the voice ARS counseling server 200. In this case, the CTI apparatus 180 instructs the exchange server 190 to connect the searched counselor to the system provider's subscriber 100 or other company's subscriber 300.

Since the message service center server 110, 220, 310 or 329, the messaging ARS gateway 140, the messaging ARS server 150, CRM DB 160, the IVR apparatus 170, the CTI apparatus 180, the exchange server 190 and the voice ARS counseling server 200 in FIG. 10 correspond to the message service center server 20, the messaging ARS gateway 25, the messaging ARS server 30, the customer information management apparatus 55, the IVR apparatus 50, the CTI apparatus 60, the exchange server 45, and the voice ARS counseling server 70 of the ARS text message providing system of FIG. 1, overlapping descriptions in this regard are omitted.

The mobile device and the method for transmission and reception of an ARS text message that have been described referring to FIG. 9 can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A messaging automatic response service (ARS) server for transceiving an ARS text message with a mobile device, comprising:
   a receiver configured to receive an ARS request text message sent by the mobile device from a message service center server;
   an ARS text message generator configured to analyze the received ARS request text message and generate an ARS response text message including at least one automatic response menu text;
   a transmitter configured to transmit the generated ARS response text message to the message service center server;
   a state information generator configured to generate state information for an automatic response history corresponding to one or both of the received ARS request text message and the generated ARS response text message; and
   a state information transmitter configured to transmit the generated state information for the automatic response history to a first apparatus of a voice ARS system,
   wherein the first apparatus initiates a voice ARS service process by searching customer information of the mobile device from a second apparatus, and transmitting the transmitted state information for the automatic response history to a third apparatus of the voice ARS system, and wherein the third apparatus is a computer telephony integration (CTI) apparatus in the voice ARS system and instructs an exchange server to connect an available counselor to the mobile device.

2. The messaging ARS server of claim 1,
wherein the state information generator generates the state information for the automatic response history based on one or both of the received ARS request text message and the generated ARS response text message.

3. The messaging ARS server of claim 1,
wherein the ARS request text message includes an identification number of the messaging ARS server, and the ARS response text message includes an identification number of the mobile device.

4. The messaging ARS server of claim 1,
wherein the ARS request text message includes a shortcut key input from user interface,
the ARS text message generator generates the ARS response text message based on the shortcut key, and
the automatic response menu text corresponds to the shortcut key.

5. The messaging ARS server of claim 1, further comprising:
a customer information searcher configured to search the customer information of the mobile device from the second apparatus of the voice ARS system.

6. The messaging ARS server of claim 5,
wherein the customer information searcher searches the customer information based on the identification number of the mobile device, and
the customer information includes at least one of a device type, a membership level, a charging rate plan, user personal information, a password, nonpayment information and billing method with respect to the user of the mobile device.

7. The messaging ARS server of claim 5,
wherein when the ARS request text message includes location information, the customer information searcher searches the customer information based on the location information, and
the state information transmitter transmits the searched customer information directly to the CTI apparatus of the voice ARS system.

8. The messaging ARS server of claim 1,
wherein the first apparatus initiates the voice ARS service process with the mobile device based on the transmitted state information.

9. The messaging ARS server of claim 1,
wherein the state information transmitter transmits the generated state information to a mobile phone computer server of the voice ARS system.

10. The messaging ARS server of claim 1,
wherein when the mobile device is a mobile device subscribed to a first service, the ARS request text message is received from a first message service center corresponding to the first service.

11. The messaging ARS server of claim 1,
wherein the ARS request text message is transmitted from the message service center to a messaging ARS gateway, and
the receiver receives the ARS request text message from the messaging ARS gateway.

12. The messaging ARS server of claim 11,
wherein the voice ARS system comprises the messaging ARS server, and
the messaging ARS system comprises the messaging ARS gateway.

13. A method for transceiving an automatic response service (ARS) text message with a mobile device, comprising:
receiving an ARS request text message sent by a mobile device from a message service center server;
analyzing the received ARS request text message and generating an ARS response text message including at least one automatic response menu text;
transmitting the generated ARS response text message to the message service center server;
generating state information for an automatic response history corresponding to one or both of the received ARS request text message and the generated ARS response text message; and
transmitting the generated state information for the automatic response history to a first apparatus of a voice ARS system,
wherein the first apparatus initiates a voice ARS service process by searching customer information of the mobile device from a second apparatus, and transmitting the transmitted state information for the automatic response history to a third apparatus of the voice ARS system, and
wherein the third apparatus is a computer telephony integration (CTI) apparatus in the voice ARS system and instructs an exchange server to connect an available counselor to the mobile device.

14. A mobile device, comprising:
an input receiver configured to receive input of an identification number of a messaging ARS server through user interface;
an ARS request text message generator configured to generate an ARS request text message based on the identification number;
a receiver configured to transmit the generated ARS request text message to a message service center server, and receive an ARS response text message including at least one automatic menu text from the message service center server;
a display configured to display the received automatic response menu text on a display of the mobile device; and
a voice ARS processor configured to connect to a voice ARS system, when a button corresponding to voice ARS is selected through the user interface,
wherein the voice ARS processor receives, from the voice ARS system, ARS voice data corresponding to one or both of the ARS request text message and the ARS response text message,
a first apparatus of the voice ARS system initiates a voice ARS service process, by searching customer information of the mobile device from a second apparatus, and transmitting state information for an automatic response history corresponding to one or both of the ARS request text message and the ARS response text message to a third apparatus of the voice ARS system, and
the third apparatus is a computer telephony integration (CTI) apparatus in the voice ARS system and instructs an exchange server to connect an available counselor to the mobile device.

15. The mobile device of claim 14, wherein the ARS request text message generator generates a first ARS request text message based on the identification number, when a shortcut key corresponding to at least one automatic response menu text is input through the user interface, the ARS request text message generator generates a second ARS request text message corresponding to the input shortcut key, and the voice ARS processor receives ARS data corresponding to one or both of the second ARS request text message and the ARS response text message from the voice ARS system.

16. The mobile device of claim 14, wherein the ARS request text message is delivered to the messaging ARS server by the message service center server, and the ARS response text message is transmitted from the messaging ARS server to the message service center server.

17. The mobile device of claim 14, wherein the ARS voice data are counselor's voice data corresponding to one or both of the ARS request text message and the ARS response text message.

\* \* \* \* \*